(12) United States Patent
Miyazaki

(10) Patent No.: US 9,365,703 B2
(45) Date of Patent: Jun. 14, 2016

(54) RUBBER COMPOSITION FOR TREAD, AND PNEUMATIC TIRE

(71) Applicant: SUMITOMO RUBBER INDUSTRIES, LTD., Kobe-shi, Hyogo (JP)

(72) Inventor: Tatsuya Miyazaki, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 13/914,754

(22) Filed: Jun. 11, 2013

(65) Prior Publication Data

US 2013/0331498 A1 Dec. 12, 2013

(30) Foreign Application Priority Data

Jun. 12, 2012 (JP) ................. 2012-133111

(51) Int. Cl.
*C08L 9/00* (2006.01)
*C08L 9/06* (2006.01)
*B60C 1/00* (2006.01)

(52) U.S. Cl.
CPC ............... *C08L 9/00* (2013.01); *B60C 1/0016* (2013.04); *C08L 9/06* (2013.01); *Y02T 10/862* (2013.01)

(58) Field of Classification Search
CPC ........... B60C 1/0016; C08L 9/00; C08L 9/06; C08K 3/36; C08K 3/04; Y02T 10/862
USPC .......................................... 524/493, 495, 518
See application file for complete search history.

(56) References Cited

U.S. PATENT DOCUMENTS

| 7,691,957 B2 | 4/2010 | Suzuki et al. |
| 2005/0171267 A1 | 8/2005 | Zanzig et al. |
| 2008/0169053 A1 | 7/2008 | Nakamura |
| 2009/0137718 A1 | 5/2009 | Hirabayashi |
| 2010/0108213 A1 | 5/2010 | Miyazaki |
| 2010/0186868 A1 | 7/2010 | Sandstrom et al. |
| 2010/0204372 A1 | 8/2010 | Miyazaki |
| 2010/0224299 A1 | 9/2010 | Miyazaki |
| 2011/0112212 A1 | 5/2011 | Kimura et al. |
| 2012/0016056 A1* | 1/2012 | Miyazaki ............ 523/156 |

FOREIGN PATENT DOCUMENTS

| CN | 1663993 A | 9/2005 |
| EP | 0 270 071 A2 | 6/1988 |
| EP | 1 637 548 A1 | 3/2006 |
| EP | 2 184 317 A1 | 5/2010 |
| EP | 2 223 959 A1 | 9/2010 |
| EP | 2 407 507 A1 | 1/2012 |
| JP | 6-57767 B2 | 8/1994 |
| JP | 2003-514078 A | 4/2003 |
| JP | 2005-213508 A | 8/2005 |
| JP | 2005-314533 A | 11/2005 |
| JP | 2006-63285 A | 3/2006 |
| JP | 2006-104455 A | 4/2006 |
| JP | 2007-262206 A | 10/2007 |
| JP | 2007-326942 A | 12/2007 |
| JP | 2009-263587 A | 11/2009 |
| JP | 2010-111753 A | 5/2010 |
| JP | 2010-209255 A | 9/2010 |
| JP | 2010-241982 A | 10/2010 |
| JP | 2011-116823 A | 6/2011 |
| JP | 2011-122024 A | 6/2011 |
| JP | 2011-122062 A | 6/2011 |
| JP | 2011-132307 A | 7/2011 |
| JP | 2011-144262 A | 7/2011 |
| JP | 2011-144323 A | 7/2011 |
| JP | 2012-052028 A | 3/2012 |
| WO | WO 01/34658 A1 | 5/2001 |
| WO | WO 2005/000921 A1 | 1/2005 |
| WO | WO 2008/044722 A1 | 4/2008 |
| WO | WO-2009/072650 A1 | 6/2009 |
| WO | WO 2010/104149 A1 | 9/2010 |

OTHER PUBLICATIONS

JP 2011-122024 A (2011), machine translation, JPO Advanced Industrial Property Network (AIPN).*
JP 2011-144323 A (2011), machine translation, JPO Advanced Industrial Property Network (AIPN).*

* cited by examiner

Primary Examiner — Susannah Chung
Assistant Examiner — Josephine Chang
(74) *Attorney, Agent, or Firm* — Birch, Stewart, Kolasch & Birch, LLP

(57) ABSTRACT

Rubber composition for treads, providing pneumatic tires (particularly for passenger vehicles and sport utility vehicles) having both excellent abrasion resistance and good wet grip performance. The rubber composition also provides the tires with good fuel economy and elongation at break. The rubber composition includes, per 100% by mass of a rubber component, 40-75% by mass of BR and 25-55% by mass of SBR, and includes, per 100 parts by mass of the rubber component, 40-120 parts by mass of a silica having a nitrogen adsorption specific surface area of 160-270 $m^2/g$ and 15-50 parts by mass of a carbon black having a nitrogen adsorption specific surface area of 100-250 $m^2/g$. A ratio of a total content of silica to a total content of SBR in the rubber composition is 0.70-2.50, and a ratio of a total content of carbon black to a total content of BR therein is 0.25-0.75.

8 Claims, No Drawings

RUBBER COMPOSITION FOR TREAD, AND PNEUMATIC TIRE

TECHNICAL FIELD

The present invention relates to a rubber composition for a tread, and a pneumatic tire formed from the rubber composition.

BACKGROUND ART

For tires for passenger vehicles and tires for sport utility vehicles in which the contact pressure per unit area is low, the tread portion contacting the road surface needs to have, at the same time, good abrasion resistance, wet grip performance and fuel economy, and in particular good abrasion resistance.

As the method for improving abrasion resistance, techniques that involve improving wet grip performance, fuel economy and abrasion resistance using silica having a large nitrogen adsorption specific surface area (finely divided silica) or carbon black having a large nitrogen adsorption specific surface area (finely divided carbon black) are being introduced (for example, Patent Literature 1).

Unfortunately, finely divided silica and carbon black have a strong tendency to agglomerate and are thus difficult to uniformly disperse. Hence, silica manufacturers try to improve the dispersibility of silica in a rubber composition by adjusting the surface activity and particle distribution of silica. However, in the case of a rubber composition containing a modified polymer for example, at an initial stage of kneading, the modified polymer may be bonded to silica, inhibiting dispersion of silica. Thus, finely divided silica and carbon black are difficult to uniformly disperse, and addition of finely divided silica or carbon black rather tends to reduce elongation at break.

Another method for improving abrasion resistance is to reduce the sulfur dosage and use a sulfur-containing crosslinking agent such as 1,6-bis(N,N'-dibenzylthiocarbamoyldithio)hexane, bis(3-triethoxysilylpropyl)tetrasulfide, and poly-3,6-dioxaoctane-tetrasulfide. Unfortunately, these sulfur-containing crosslinking agents are generally expensive while they can only improve abrasion resistance by about 10%. Further improvement in abrasion resistance is thus demanded.

Still another method for improving abrasion resistance is to form silica (or carbon black) and a portion of a polymer component into a masterbatch. This method, however, allows improvement in abrasion resistance by about 10%, and further improvement in abrasion resistance is thus demanded.

Yet another method for improving abrasion resistance is to introduce a modifying group interactive with silica into the end or backbone of styrene butadiene rubber to improve the dispersibility of silica. This method, however, allows improvement in abrasion resistance by about 10%, and further improvement in abrasion resistance is thus demanded.

As the method for improving abrasion resistance, a technique is also known in general in which approximately 10 to 35% by mass of a high-cis butadiene rubber synthesized with an Nd catalyst is used based on 100% by mass of the rubber component to take advantage of good abrasion resistance of the butadiene rubber itself. Unfortunately, this technique may cause a great reduction in wet grip performance in tires for passenger vehicles and tires for sport utility vehicles in which the contact pressure is low. For this reason, the amount of the high-cis butadiene rubber used is thought to be limited to not more than about 35% by mass based on 100% by mass of the rubber component.

As mentioned above, it is desired to provide a rubber composition for a tread that has both excellent abrasion resistance and good wet grip performance and also offers good fuel economy and elongation at break.

CITATION LIST

Patent Literature

Patent Literature 1: JP 2011-132307 A

SUMMARY OF INVENTION

Technical Problem

An object of the present invention is to solve the problems above and to provide a rubber composition for a tread that has both excellent abrasion resistance and good wet grip performance and also offers good fuel economy and elongation at break, and a pneumatic tire (particularly for passenger vehicles and for sport utility vehicles) formed from the rubber composition.

Solution to Problem

The present invention relates to a rubber composition for a tread, which includes, based on 100% by mass of a rubber component, 40 to 75% by mass of butadiene rubber and 25 to 55% by mass of styrene butadiene rubber; and includes, per 100 parts by mass of the rubber component, 40 to 120 parts by mass of a silica having a nitrogen adsorption specific surface area of 160 to 270 $m^2/g$, and 15 to 50 parts by mass of a carbon black having a nitrogen adsorption specific surface area of 100 to 250 $m^2/g$, wherein a ratio of a total content of silica to a total content of styrene butadiene rubber is 0.70 to 2.50, and a ratio of a total content of carbon black to a total content of butadiene rubber is 0.25 to 0.75.

Preferably, the butadiene rubber includes at least one selected from the group consisting of a butadiene rubber synthesized with a rare earth catalyst and a modified butadiene rubber for silica, and the rubber component includes 8% by mass or more of a modified-styrene butadiene rubber for silica.

Preferably, the rubber component includes a butadiene rubber synthesized with a rare earth catalyst and a modified butadiene rubber for silica each at 5% by mass or more; 15 to 50 parts by mass of the carbon black having a nitrogen adsorption specific surface area of 100 to 180 $m^2/g$ is contained per 100 parts by mass of the rubber component; and the ratio of a total content of carbon black to a total content of butadiene rubber is 0.40 to 0.75.

Preferably, the rubber composition includes a liquid resin having a softening point of −20 to 45° C., and the liquid resin is at least one of a liquid coumarone indene resin and a liquid terpene resin.

Preferably, the rubber composition includes at least one resin selected from the group consisting of a terpene resin having a softening point of 46 to 160° C., a rosin resin having a softening point of 46 to 140° C., a C5 petroleum resin having a softening point of 46 to 140° C., and an aromatic resin having a softening point of 46 to 140° C.

Preferably, the aromatic resin is at least one of a coumarone indene resin, an indene resin and an aromatic vinyl polymer that is a resin obtained by polymerizing at least one of α-methylstyrene and styrene.

Preferably, the rubber composition includes a liquid coumarone indene resin having a softening point of −20 to 45° C., a coumarone indene resin having a softening point of 46 to 140° C., and one of an aromatic vinyl polymer having a softening point of 46 to 140° C. and a terpene resin having a softening point of 46 to 160° C., wherein the aromatic vinyl polymer is a resin obtained by polymerizing at least one of α-methylstyrene and styrene.

The present invention also relates to a pneumatic tire, formed from the rubber composition.

Preferably, the pneumatic tire is for use as a tire for passenger vehicles or a tire for sport utility vehicles.

Advantageous Effects of Invention

The present invention provides a rubber composition for a tread, which includes, based on 100% by mass of a rubber component, 40 to 75% by mass of butadiene rubber and 25 to 55% by mass of styrene butadiene rubber; and includes, per 100 parts by mass of the rubber component, 40 to 120 parts by mass of a silica having a nitrogen adsorption specific surface area of 160 to 270 m$^2$/g, and 15 to 50 parts by mass of a carbon black having a nitrogen adsorption specific surface, area of 100 to 250 m$^2$/g, wherein a ratio of a total content of silica to a total content of styrene butadiene rubber is 0.70 to 2.50, and a ratio of a total content of carbon black to a total content of butadiene rubber is 0.25 to 0.75. Consequently, use of the rubber composition in a tread of a tire enables the preparation of a pneumatic tire that has both excellent abrasion resistance and good wet grip performance and also offers good fuel economy and elongation at break (durability).

DESCRIPTION OF EMBODIMENTS

The rubber composition for a tread according to the present invention includes specific amounts of butadiene rubber and styrene butadiene rubber, and also includes specific amounts of a silica (finely divided silica) having a nitrogen adsorption specific surface area of 160 to 270 m$^2$/g and a carbon black (finely divided carbon black) having a nitrogen adsorption specific surface area of 100 to 250 m$^2$/g, with the ratio of the total content of silica to the total content of styrene butadiene rubber and the ratio of the total content of carbon black to the total content of butadiene rubber each being in a specific range.

Accordingly, the rubber composition has both excellent abrasion resistance and good wet grip performance and also offers good fuel economy and elongation at break.

In conventional rubber compositions containing finely divided silica, finely divided carbon black, butadiene rubber and styrene butadiene rubber, the amounts of these components to be compounded have not sufficiently been optimized. In this context, the present inventor has focused on how each of the fillers is incorporated into each of the polymer phases, in order to optimize the amounts of these components to be compounded. It is difficult to directly observe how each of the fillers is incorporated into each of the polymer phases. Then, as a result of an extensive research assuming that butadiene rubber has lower compatibility with silica and higher compatibility with carbon black than styrene butadiene rubber (in other words, butadiene rubber has high compatibility with carbon black, while styrene butadiene rubber has high compatibility with silica), it is found out that if specific amounts of butadiene rubber, styrene butadiene rubber, finely divided silica and finely divided carbon black are used, and the ratio of the total content of silica to the total content of styrene butadiene rubber and the ratio of the total content of carbon black to the total content of butadiene rubber are each set in a specific range, then the dispersibility of the fillers in each of the polymer phases is improved to provide excellent reinforcement and therefore excellent abrasion resistance while offering good wet grip performance, as well as good fuel economy and elongation at break, thereby completing the present invention.

The rubber component of the rubber composition according to the present invention includes butadiene rubber (BR). This contributes to good abrasion resistance and crack growth resistance.

The BR is not particularly limited, and those generally used in the tire industry may be used, such as, for example, high-cis BR such as BR1220 made by ZEON Corporation and BR150B made by Ube Industries, Ltd.; BR containing 1,2-syndiotactic polybutadiene crystals (SPB), such as VCR412 and VCR617 made by Ube Industries, Ltd.; and butadiene rubbers synthesized with a rare earth catalyst (rare earth BR). Other examples include modified butadiene rubbers such as modified butadiene rubbers for silica (modified BR for silica) which have been modified with a compound interactive with silica, and tin modified butadiene rubbers (tin modified BR (modified BR for carbon black)) which have been modified with a tin compound (e.g. tin modified BR polymerized with a lithium initiator and having a vinyl bond content of 5 to 50% by mass, an Mw/Mn of 2.0 or less, and a tin atom content of 50 to 3000 ppm).

Among these, rare earth BR and modified BR for silica are preferred, and use of rare earth BR in combination with modified BR for silica is more preferred.

Since rare earth BR (BR produced (synthesized) by rare earth metal (e.g. neodymium) salt-based catalysts) has a high cis content (cis-1,4 levels), high linearities, a low vinyl content, and a low ratio (Mw/Mn) of the weight average molecular weight (Mw) to the number average molecular weight (Mn), the rare earth BR not only provides good abrasion resistance but also offers good fuel economy, elongation at break and crack growth resistance. However, though having very high compatibility with carbon black, the rare earth BR has low compatibility with silica. To tackle this problem, if modified BR for silica is used in combination with the rare earth BR, then they form one phase because rare earth BR has a chemical composition close to that of modified BR for silica. Then the modified BR for silica having high compatibility with silica allows silica to be dispersed well in the BR phase. The rare earth BR having high compatibility with carbon black allows carbon black to be dispersed well in the BR phase. Owing to such a combination of two BRs, carbon black and silica can be dispersed and distributed well in the BR phase. As a result, good abrasion resistance, fuel economy, wet grip performance and elongation at break, and in particular good abrasion resistance, can be achieved.

Next, butadiene rubbers synthesized with a rare earth catalyst (rare earth BR) will be described.

The rare earth BR is a butadiene rubber synthesized with a rare earth catalyst, and features a high cis content and a low vinyl content. As the rare earth BR, general-purpose products used in production of tires can be used.

The rare earth catalyst may be a known rare earth catalyst and examples thereof include catalysts containing a lanthanide rare earth compound, an organic aluminum compound, an aluminoxane, or a halogen-containing compound, optionally with a Lewis base. Among these, Nd catalysts are particularly preferred which contain a neodymium (Nd)-containing compound as the lanthanide rare earth compound.

Examples of the lanthanide rare earth compound include halides, carboxylates, alcholates, thioalcholates, and amides of rare earth metals of atomic numbers 57 to 71. Among these, as described above, Nd catalysts are preferred because they allow the production of BR having a high cis content and a low vinyl content.

Examples of the organic aluminum compound include compounds represented by $AlR^aR^bR^c$ (wherein $R^a$, $R^b$ and $R^c$ are the same or different, and each represent hydrogen or a hydrocarbon group having 1 to 8 carbon atoms). Examples of the aluminoxane include acyclic aluminoxanes and cyclic aluminoxanes. Examples of the halogen-containing compound include aluminum halides represented by $AlX_kR^d_{3-k}$ (wherein X represents a halogen; $R^d$ represents a C1-20 alkyl, aryl or aralkyl group; and k represents 1, 1.5, 2 or 3); strontium halides such as $Me_3SrCl$, $Me_2SrCl_2$, $MeSrHCl_2$, and $MeSrCl_3$; metal halides such as silicon tetrachloride, tin tetrachloride, and titanium tetrachloride. The Lewis base is used for complexation of the lanthanide rare earth compound, and suitable examples include acetylacetone, ketones and alcohols.

The rare earth catalyst may be used either in solution in an organic solvent (e.g. n-hexane, cyclohexane, n-heptane, toluene, xylene, and benzene) or supported on an appropriate carrier (e.g. silica, magnesia, and magnesium chloride), at the time of polymerizing butadiene. With regard to the polymerization conditions, the polymerization may be either solution polymerization or bulk polymerization, and the polymerization temperature is preferably –30 to 150° C., and the polymerization pressure may be appropriately selected depending on the other conditions.

The rare earth BR preferably has a ratio (Mw/Mn) of the weight average molecular weight (Mw) to the number average molecular weight (Mn) of 1.2 or more, more preferably 1.5 or more. At a ratio of less than 1.2, the processability tends to be significantly poor. The ratio Mw/Mn is preferably 5 or less, more preferably 4 or less, still more preferably 3 or less, particularly preferably 2 or less, and most preferably 1.9 or less. At a ratio of more than 5, the effect of improving abrasion resistance tends to be smaller.

The Mw of the rare earth BR is preferably 300,000 or more, and more preferably 500,000 or more, whereas it is preferably 1,500,000 or less, and more preferably 1,200,000 or less. Moreover, the Mn of the rare earth BR is preferably 100,000 or more, and more preferably 150,000 or more, whereas it is preferably 1,000,000 or less, and more preferably 800,000 or less. If the Mw or Mn is less than the lower limit, the abrasion resistance tends to be reduced, and the fuel economy tends to be poor. If the Mw or Mn is more than the upper limit, the processability may be poor.

Herein, the weight average molecular weight (Mw) and the number average molecular weight (Mn) can be determined relative to polystyrene standards based on the values measured with a gel permeation chromatograph (GPC) (GPC-8000 Series made by Tosoh Corporation, detector: differential refractometer, column: TSKGEL SUPERMULTIPORE HZ-M made by Tosoh Corporation).

The rare earth BR preferably has a cis content of 90% by mass or more, more preferably 93% by mass or more, and still more preferably 95% by mass or more. At a cis content of less than 90% by mass, the abrasion resistance may be reduced.

The rare earth BR preferably has a vinyl content of 1.8% by mass or less, more preferably 1.0% by mass or less, still more preferably 0.5% by mass or less, and particularly preferably 0.3% by mass or less. At a vinyl content of more than 1.8% by mass, the abrasion resistance may be reduced.

In the present invention, the vinyl content (1,2-butadiene unit content) and cis content (cis-1,4-butadiene unit content) of rare earth BR can be measured by infrared absorption spectrometry.

In the case where the rubber composition according to the present invention contains the rare earth BR, the content of the rare earth BR, based on 100% by mass of the rubber component, is preferably 5% by mass or more, more preferably 10% by mass or more, still more preferably 20% by mass or more, and particularly preferably 30% by mass or more. At a content of less than 5% by mass, satisfactory abrasion resistance and elongation at break may not be obtained. The content is preferably 60% by mass or less, more preferably 50% by mass or less, and still more preferably 40% by mass or less. At a content of more than 60% by mass, satisfactory wet grip performance and abrasion resistance may not be obtained.

Next, modified butadiene rubbers for silica (modified BR for silica) which have been modified with a compound interactive with silica will be described.

The modified BR for silica is not particularly limited as long as it is a BR modified with a compound containing a functional group interactive with silica (preferably a functional group containing at least one atom selected from the group consisting of nitrogen, oxygen and silicon). Examples of the modified BR for silica include end-modified butadiene rubbers obtained by modifying at least one end of butadiene rubber with the compound containing the functional group (modifier); backbone-modified butadiene rubbers containing the functional group in the backbone; and backbone/end-modified butadiene rubbers containing the functional group both in the backbone and at an end (e.g. backbone/end-modified butadiene rubbers containing the functional group in the backbone and having at least one end modified with the modifier). End-modified butadiene rubbers (end-modified BR) are preferred.

Examples of the functional group include an amino group, an amide group, an alkoxysilyl group, an isocyanate group, an imino group, an imidazole group, a urea group, an ether group, a carbonyl group, an oxycarbonyl group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, and an epoxy group. These functional groups may contain a substituent. Especially, the functional group is preferably a primary, secondary or tertiary amino group (in particular a glycidylamino group), an epoxy group, a hydroxyl group, an alkoxy group (preferably an alkoxy group having 1 to 6 carbon atoms), or an alkoxysilyl group (preferably an alkoxysilyl group having 1 to 6 carbon atoms) because they are highly effective in improving fuel economy and wet grip performance.

The end-modified BR is preferably a modified butadiene rubber (S-modified BR) that has been modified with a compound represented by the following formula (1):

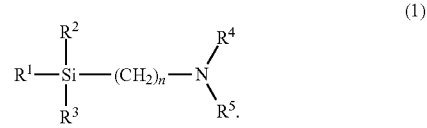

wherein $R^1$, $R^2$ and $R^3$ are the same or different, and each represent an alkyl group, an alkoxy group, a silyloxy group, an acetal group, a carboxyl group (—COOH), a mercapto group (—SH), or a derivative thereof; $R^4$ and $R^5$ are the same or different, and each represent a hydrogen atom or an alkyl group, provided that $R^4$ and $R^5$ may be bonded to each other to form a ring structure with the nitrogen atom; and n represents an integer.

Examples of the S-modified BR include those described in JP 2010-111753 A and others.

In the formula (1), $R^1$, $R^2$ and $R^3$ are each suitably an alkoxy group (preferably an alkoxy group having 1 to 8 carbon atoms, more preferably 1 to 4 carbon atoms) because then excellent fuel economy and tensile resistance are obtained. $R^4$ and $R^5$ are each suitably an alkyl group (preferably an alkyl group having 1 to 3 carbon atoms). The symbol n is preferably an integer of 1 to 5, more preferably 2 to 4, and still more preferably 3. In the case where $R^4$ and $R^5$ are bonded to each other to form a ring structure with the nitrogen atom, the ring structure is preferably a 4- to 8-membered ring. It should be noted that examples of the alkoxy group also include cycloalkoxy groups (e.g. a cyclohexyloxy group) and aryloxy groups (e.g. a phenoxy group and a benzyloxy group). When such a preferred compound is used, then the effect of the present invention can be more favorably obtained.

Specific examples of the compound represented by the formula (1) include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. Among these, 3-dimethylaminopropyltrimethoxysilane, 3-dimethylaminopropyltriethoxysilane, and 3-diethylaminopropyltrimethoxysilane are preferred because they allow the aforementioned properties to be improved well. Each of the compounds mentioned above may be used alone or two or more of them may be used in combination.

As the method for modifying butadiene rubber with the compound represented by the formula (1) (modifier), known methods as described in JP H06-53768 B, JP H06-57767 B, and others may be used. For example, butadiene rubber can be modified by contacting butadiene rubber with the compound. More specifically, mention may be made of a method in which butadiene rubber is prepared by anionic polymerization, and then a predetermined amount of the compound is added to the rubber solution to react the compound with the polymerizing end (active end) of butadiene rubber.

The end-modified BR is preferably a modified butadiene rubber that has been modified with a low molecular weight compound containing a glycidylamino group within the molecule, and more preferably a modified butadiene rubber (A-modified BR) that has been modified with a mixture of a low molecular weight compound containing a glycidylamino group within the molecule and an oligomer consisting of a dimer or higher order multimer of the low molecular weight compound. Examples of the A-modified BR include those described in JP 2009-275178 A and others.

The oligomer is preferably a dimer to decamer of the low molecular weight compound. The low molecular weight compound is an organic compound having a molecular weight of 1000 or less, and suitable examples thereof include compounds represented by the following formula (2):

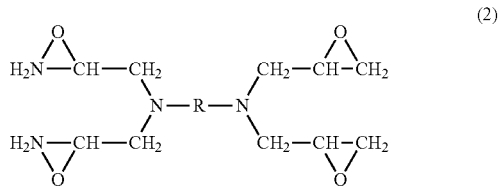

wherein R is a divalent hydrocarbon group or a divalent organic group containing at least one polar group selected from the group consisting of oxygen-containing polar groups such as ether, epoxy, and ketone; sulfur-containing polar groups such as thioether and thioketone; and nitrogen-containing polar groups such as a tertiary amino group and an imino group. The divalent hydrocarbon group may be saturated or unsaturated, and may be linear, branched or cyclic. Examples of the divalent hydrocarbon group include alkylene groups, alkenylene groups and phenylene groups. Specific examples thereof include methylene, ethylene, butylene, cyclohexylene, 1,3-bis(methylene)-cyclohexane, 1,3-bis(ethylene)-cyclohexane, o-phenylene, m-phenylene, p-phenylene, m-xylene, p-xylene, and bis(phenylene)-methane.

Specific examples of the low molecular weight compound represented by the formula (2) include tetraglycidyl-1,3-bisaminomethylcyclohexane, N,N,N',N'-tetraglycidyl-m-xylenediamine, 4,4-methylene-bis(N,N-diglycidylaniline), 1,4-bis(N,N-diglycidylamino)cyclohexane, N,N,N',N'-tetraglycidyl-p-phenylenediamine, 4,4'-bis(diglycidylamino)benzophenone, 4-(4-glycidylpiperazinyl)-(N,N-diglycidyl)aniline, and 2-[2-(N,N-diglycidylamino)ethyl]-1-glycidylpyrrolidine. Among these, tetraglycidyl-1,3-bisaminomethylcyclohexane is preferred.

Suitable examples of the oligomer component include dimers represented by the following formula (3) and trimers represented by the following formula (4):

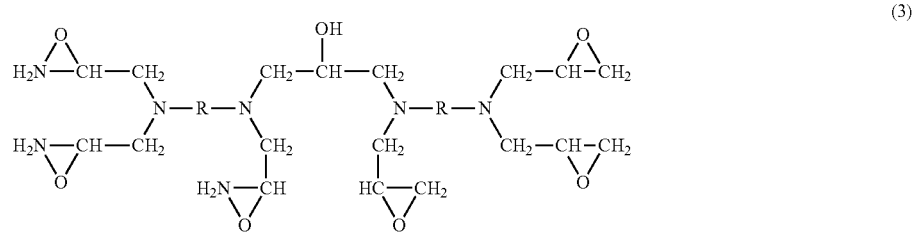

-continued

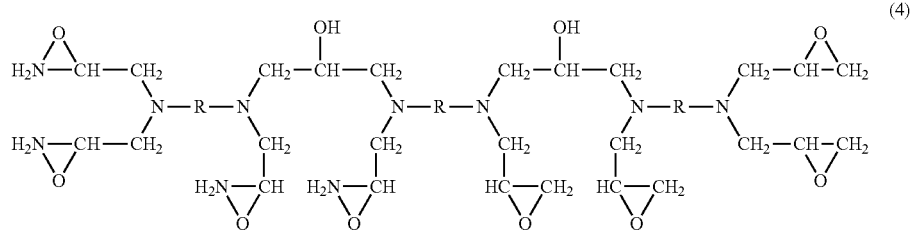

(4)

wherein R is defined as in the formula (2) above.

In the case of modification with a mixture of the low molecular weight compound and the oligomer, the modifier (mixture) preferably includes 75 to 95% by mass of the low molecular weight compound and 25 to 5% by mass of the oligomer, based on 100% by mass of the modifier (mixture).

The ratio of the low molecular weight compound to the oligomer component in the modifier can be measured by GPC.

Specifically, a column is selected for measurement which allows measurement of samples ranging from the low molecular weight compound to the oligomer component. With respect to peaks obtained through measurement, a perpendicular is drawn from the first inflection point on the high molecular weight side of the peak derived from the low molecular weight compound, and then the ratio of the area of the component on the low molecular weight side to the area of the component on the high molecular weight side is determined. This area ratio corresponds to the ratio of the low molecular weight compound to the oligomer component.

It should be noted that the peak on the high molecular weight side from the oligomer component is subjected to integration until the point corresponding to a molecular weight that reaches not more than 10 times the molecular weight of the low molecular weight compound, when determined relative to polystyrene standards, or the point at which the component peak reaches 0 if the component peak reaches 0 before the point corresponding to a molecular weight that reaches not more than 10 times the molecular weight of the low molecular weight compound.

The reaction of the conjugated diene polymer with the modifier is performed by reacting the modifier with the active end of the conjugated diene polymer.

The method for modifying butadiene rubber with the low molecular weight compound containing a glycidylamino group within the molecule can be performed as mentioned for the modification with the compound represented by the formula (1) (modifier).

The modified BR for silica preferably has a vinyl content of 35% by mass or less, more preferably 30% by mass or less. At a vinyl content of more than 35% by mass, the fuel economy may be reduced. The lower limit of the vinyl content is not particularly limited. The lower limit is preferably 1% by mass or more, and more preferably 10% by mass or more. At a vinyl content of less than 1% by mass, the heat resistance and deterioration resistance may be reduced.

The modified BR for silica preferably has a weight average molecular weight (Mw) of 100,000 or more, more preferably 400,000 or more. At an Mw of less than 100,000, satisfactory abrasion resistance and elongation at break may not be obtained. The Mw is preferably 2,000,000 or less, and more preferably 800,000 or less. At an Mw of more than 2,000,000, reduced processability may cause poor dispersion, possibly failing to provide satisfactory fuel economy, abrasion resistance and elongation at break.

In the case where the rubber composition according to the present invention contains the modified BR for silica, the content of the modified BR for silica, based on 100% by mass of the rubber component, is preferably 5% by mass or more, more preferably 8% by mass or more, and still more preferably 10% by mass or more. At a content of less than 5% by mass, satisfactory fuel economy and abrasion resistance may not be obtained. The content is preferably 40% by mass or less, more preferably 30% by mass or less, and still more preferably 25% by mass or less. At a content of more than 40% by mass, the abrasion resistance and elongation at break may be reduced.

The content of BR, based on 100% by mass of the rubber component, is 40% by mass or more, preferably 45% by mass or more, and more preferably 50% by mass or more. At a content of less than 40% by mass, the abrasion resistance is reduced. The content of BR is 75% by mass or less, preferably 65% by mass or less, and more preferably 60% by mass or less. At a content of more than 75% by mass, the abrasion resistance, wet grip performance and processability become poor.

The rubber component of the rubber composition according to the present invention includes styrene butadiene rubber (SBR). This contributes to good wet grip performance, fuel economy and resistance to reversion.

The SBR is not particularly limited, and examples of the SBR include emulsion polymerized SBR (E-SBR), solution polymerized SBR (S-SBR), and modified styrene butadiene rubbers for silica which have been modified with a compound interactive with silica (modified SBR for silica). Among these, E-SBR and modified SBR for silica are preferred, and use of E-SBR in combination with modified SBR for silica is more preferred. The E-SBR has a high content of high molecular weight components, and offers excellent abrasion resistance and elongation at break. On the other hand, the modified SBR for silica interacts strongly with silica and can thus allow silica to be dispersed well to improve fuel economy and abrasion resistance.

Next, E-SBR will be described.

The E-SBR is not particularly limited, and those generally used in the tire industry may be used.

In the case where the rubber composition according to the present invention contains the E-SBR, the content of the E-SBR, based on 100% by mass of the rubber component, is preferably 5% by mass or more, more preferably 10% by mass or more, and still more preferably 15% by mass or more. At a content of less than 5% by mass, satisfactory abrasion resistance, elongation at break and processability may not be obtained. The content is preferably 50% by mass or less, more preferably 40% by mass or less, and still more preferably 30% by mass or less. At a content of more than 50% by mass, the fuel economy and abrasion resistance tend to be reduced.

Next, modified styrene butadiene rubbers for silica (modified SBR for silica) which have been modified with a compound interactive with silica will be described.

The modified SBR for silica may be one in which the skeleton structure, namely, butadiene rubber, of the modified BR for silica is replaced by styrene butadiene rubber. Especially, the modified SBR for silica is preferably a modified styrene butadiene rubber (S-modified SBR) that has been modified with the compound represented by the formula (1). Suitable examples include solution polymerized styrene butadiene rubbers (S-SBR) having a polymerizing end (active end) modified with the compound represented by the formula (1) (S-modified S-SBR (modified SBR described in JP 2010-111753 A)).

The modified SBR for silica preferably has a bound styrene content of 40% by mass or less, more preferably 35% by mass or less, and still more preferably 30% by mass or less. At a bound styrene content of more than 40% by mass, the fuel economy may be poor. The bound styrene content of the modified SBR for silica is preferably 15% by mass or more, and more preferably 23% by mass or more. At a bound styrene content of less than 15% by mass, the wet grip performance tends to be poor.

The styrene content is calculated by $^1$H-NMR measurement.

In the case where the rubber composition according to the present invention contains the modified SBR for silica, the content of the modified SBR for silica, based on 100% by mass of the rubber component, is preferably 8% by mass or more, more preferably 25% by mass or more, and still more preferably 35% by mass or more. At a content of less than 8% by mass, satisfactory wet grip performance and fuel economy may not be obtained. The content is preferably 55% by mass or less, and more preferably 50% by mass or less. At a content of more than 55% by mass, the abrasion resistance and fuel economy tend to be reduced.

The content of SBR, based on 100% by mass of the rubber component, is 25% by mass or more, preferably 35% by mass or more, and more preferably 40% by mass or more. At a content of less than 25% by mass, the wet grip performance and reversion resistance may be poor. The content of SBR is 55% by mass or less, preferably 50% by mass or less. At a content of more than 55% by mass, the relative amount of BR compounded is smaller and therefore satisfactory abrasion resistance is not obtained.

Examples of rubber materials other than BR and SBR usable in the rubber composition according to the present invention include diene rubbers such as natural rubber (NR), epoxidized natural rubber (ENR), isoprene rubber (IR), highly purified natural rubber (HPNR having a phosphorus content of 200 ppm or less), 3,4-polyisoprene rubber (3,4-IR), styrene isoprene butadiene rubber (SIBR), chloroprene rubber (CR), and acrylonitrile butadiene rubber (NBR). The rubber component may include rubber materials other than diene rubbers (e.g. ethylene propylene diene rubber (EPDM) and butyl rubber (IIR)). Each of these rubber materials may be used alone or two or more of them may be used in combination. Among these, NR is preferred because it provides good elongation at break.

The rubber composition according to the present invention contains a silica (finely divided silica) having a nitrogen adsorption specific surface area of 160 to 270 m$^2$/g. Each of the finely divided silicas may be used alone or two or more of them may be used in combination.

The finely divided silica preferably has a nitrogen adsorption specific surface area (N$_2$SA) of 170 m$^2$/g or more, more preferably 195 m$^2$/g or more, and still more preferably 210 m$^2$/g or more. At a nitrogen adsorption specific surface area of less than 160 m$^2$/g, the wet grip performance, elongation at break and abrasion resistance, and in particular abrasion resistance, are not sufficiently improved. The nitrogen adsorption specific surface area is preferably 250 m$^2$/g or less, and more preferably 245 m$^2$/g or less. At a nitrogen adsorption specific surface area of more than 270 m$^2$/g, the dispersibility is poor and therefore the fuel economy, elongation at break and abrasion resistance are reduced.

Herein, the N$_2$SA of silica is a value measured by the BET method according to ASTM D3037-81.

The content of the finely divided silica is 40 parts by mass or more, preferably 50 parts by mass or more, per 100 parts by mass of the rubber component. At a content of less than 40 parts by mass, the effects of improving fuel economy, wet grip performance, elongation at break, and abrasion resistance are not sufficiently obtained. The content is 120 parts by mass or less, preferably 110 parts by mass or less, more preferably 105 parts by mass or less, and still more preferably 100 parts by mass or less, per 100 parts by mass of the rubber component. At a content of more than 120 parts by mass, the dispersibility is poor and therefore the fuel economy, elongation at break and abrasion resistance are reduced.

In the present invention, silica other than the finely divided silica (large particle size silica) may be used together with the finely divided silica. This further improves fuel economy and wet grip performance. The silica other than the finely divided silica preferably has a nitrogen adsorption specific surface area of 100 to 160 m$^2$/g, more preferably 100 to 130 m$^2$/g.

Here, the total content of silica (total content of finely divided silica and large particle size silica) is preferably the same as the amount of the finely divided silica compounded when the finely divided silica is used alone.

The ratio (mass ratio) of the total content of silica to the total content of styrene butadiene rubber is 0.70 or more, preferably 0.80 or more, and more preferably 0.90 or more. At a ratio of less than 0.70, satisfactory fuel economy, wet grip performance and abrasion resistance, and in particular satisfactory fuel economy and wet grip performance, are not obtained.

The ratio is 2.50 or less, preferably 2.00 or less, more preferably 1.70 or less, and still more preferably 1.50 or less. At a ratio of more than 2.50, satisfactory wet grip performance, abrasion resistance and elongation at break, and in particular satisfactory wet grip performance, are not obtained.

Here, the content of silica includes silica other than the finely divided silica.

In the rubber composition according to the present invention, a silane coupling agent is preferably used in combination with the silica. The silane coupling agent may be any silane coupling agent conventionally used in combination with silica in the rubber industry. Examples of the silane coupling agent include sulfide silane coupling agents such as bis(3-triethoxysilylpropyl)disulfide and bis(3-triethoxysilylpropyl)tetrasulfide; mercapto silane coupling agents such as 3-mercaptopropyltrimethoxysilane, Si363 made by Evonik Degussa, and NXT-Z30, NXT-Z45 and NXT-Z60 made by Momentive Performance Materials; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Each of these may be used alone or two or more thereof may be used in combination. Among these, sulfide silane coupling agents are preferred, and bis(3-triethoxysilylpropyl)disulfide is more preferred.

The content of the silane coupling agent is preferably 3 parts by mass or more, and more preferably 5 parts by mass or more, per 100 parts by mass of silica. At a content of less than 3 parts by mass, the abrasion resistance, elongation at break and viscosity (processability) tend to be poor. The content of the silane coupling agent is preferably 20 parts by mass or less, more preferably 15 parts by mass or less, and still more preferably 12 parts by mass or less, per 100 parts by mass of silica. At a content of more than 20 parts by mass, no effect proportional to increase in cost tends to be obtained.

The rubber composition according to the present invention contains a carbon black (finely divided carbon black) having a nitrogen adsorption specific surface area of 100 to 250 m$^2$/g. Each of the finely divided carbon blacks may be used alone or two or more of them may be used in combination.

The finely divided carbon black has a nitrogen adsorption specific surface area (N$_2$SA) of 100 m$^2$/g or more, preferably 120 m$^2$/g or more, and more preferably 140 m$^2$/g or more. At an N$_2$SA of less than 100 m$^2$/g, satisfactory wet grip performance, elongation at break and abrasion resistance, and in particular satisfactory elongation at break and abrasion resistance, are not obtained. The N$_2$SA is 250 m$^2$/g or less, preferably 200 m$^2$/g or less, and more preferably 180 m$^2$/g or less. At an N$_2$SA of more than 250 m$^2$/g, the dispersibility is poor and therefore the fuel economy, elongation at break and abrasion resistance are reduced.

Herein, the N$_2$SA of carbon black is determined according to JIS K 6217-2:2001.

The content of the finely divided carbon black is 15 parts by mass or more, preferably 20 parts by mass or more, per 100 parts by mass of the rubber component. At a content of less than 15 parts by mass, satisfactory wet grip performance, elongation at break and abrasion resistance are not obtained. The content is 50 parts by mass or less, preferably 40 parts by mass or less, and more preferably 30 parts by mass or less, per 100 parts by mass of the rubber component. At a content of more than 50 parts by mass, satisfactory fuel economy, wet grip performance and elongation at break are not obtained.

In the present invention, carbon black other than the finely divided carbon black (large particle size carbon black) may be used together with the finely divided carbon black. This further improves wet grip performance. The carbon black other than the finely divided carbon black preferably has a nitrogen adsorption specific surface area of 60 to 100 m$^2$/g.

Here, the total content of carbon black (total content of finely divided carbon black and large particle size carbon black) is preferably the same as the amount of the finely divided carbon black compounded when the finely divided carbon black is used alone.

The ratio (mass ratio) of the total content of carbon black to the total content of butadiene rubber is 0.25 or more, preferably 0.40 or more. At a ratio of less than 0.25, satisfactory wet grip performance, abrasion resistance and elongation at break, and in particular satisfactory wet grip performance and abrasion resistance, are not obtained. The ratio is 0.75 or less, preferably 0.60 or less, and more preferably 0.50 or less. At a ratio of more than 0.75, satisfactory fuel economy, wet grip performance, elongation at break and abrasion resistance, and in particular satisfactory fuel economy, wet grip performance and abrasion resistance, are not obtained.

Here, the content of carbon black includes carbon black other than the finely divided carbon black.

The rubber composition according to the present invention preferably contains sulfur. Examples of the sulfur include powder sulfur, precipitated sulfur, colloidal sulfur, insoluble sulfur, and highly dispersible sulfur.

The content of sulfur is preferably 0.5 parts by mass or more, and more preferably 0.7 parts by mass or more, per 100 parts by mass of the rubber component. The content is preferably 2 parts by mass or less, and more preferably 1.7 parts by mass or less. At a content in the range, the effect of the present invention can be more favorably obtained.

Sulfur is generally used in rubber compositions for tires. When sulfur is allowed to dissolve in a polymer, since sulfur forms an S8 structure, has a melting point of 113° C. and has a polarity close to carbon disulfide (an SP value (solubility parameter) of 10), it is in general difficult to disperse sulfur uniformly in a diene rubber having low polarity (an SP value of 8 to 9) such as BR and SBR.

When a liquid resin having a softening point of −20 to 45° C. is compounded in the rubber composition according to the present invention, since the resin itself has good dispersibility and properly lubricates the polymer chains of the diene rubbers (BR, SBR) to provide proper lubrication between the polymer chains of the diene rubbers and the finely divided silica, or finely divided carbon black, or sulfur, the finely divided silica, finely divided carbon black and sulfur can be dispersed uniformly in the entire rubber composition in the kneading step. Moreover, since sulfur is uniformly dispersed, the polymers can be uniformly crosslinked to each other in the vulcanizing step.

As mentioned above, when the liquid resin having the specific softening point is compounded in the rubber composition according to the present invention, the dispersibility of the finely divided silica and finely divided carbon black is further improved and the polymers are uniformly crosslinked to each other. As a result, good elongation at break can be obtained and therefore the fuel economy, wet grip performance, elongation at break and abrasion resistance can be improved in a balanced manner.

Particularly when a liquid coumarone indene resin having the specific softening point is used as the liquid resin, the resin and sulfur (particularly the oxygen atom contained in the liquid coumarone indene resin and sulfur) attract each other via van der Waals forces, so that the surface of sulfur is coated with the resin, reducing the surface energy of sulfur (reduced tendency of sulfur to agglomerate). Consequently, the difference in the SP value between the surface of sulfur and the diene rubbers is reduced to further accelerate dispersion of sulfur. In addition, since the resin itself has good dispersibility and properly lubricates the polymer chains of the diene rubbers, the sulfur is dispersed uniformly in the entire rubber composition in the kneading step, and then the polymers are uniformly crosslinked to each other in the vulcanizing step. Therefore, the effects of improving the aforementioned performance properties can be more favorably obtained.

As described above, the rubber composition according to the present invention preferably contains a liquid resin having a softening point of −20 to 45° C. The liquid resin is preferably compounded to replace oil.

The softening point of the liquid resin is −20° C. or more, preferably −10° C. or more. At a softening point of less than −20° C., the effects of improving fuel economy and elongation at break may not be sufficiently obtained. The softening point is 45° C. or less, preferably 40° C. or less. At a softening point of more than 45° C., the fuel economy, elongation at break and abrasion resistance may be poor.

Here, the softening point of the liquid resin refers to a temperature at which a ball drops in measurement of the softening point specified in JIS K 6220-1:2001 with a ring and ball softening point measuring apparatus.

The liquid resin is not particularly limited as long as it has the softening point mentioned above. Examples of the liquid resin include liquid aromatic resins (or aromatic resins having the softening point above (particularly liquid coumarone indene resins (or coumarone indene resins having the softening point above))), liquid terpene resins (or terpene resins having the softening point above), and liquid rosin resins (or rosin resins having the softening point above). Among these, liquid aromatic resins (particularly liquid coumarone indene resins) and liquid terpene resins are preferred, and liquid coumarone indene resins are more preferred, because they allow the effect of the present invention to be favorably achieved.

The aromatic resins refer to resins obtained by polymerization of the C8-C10 aromatic fraction generally obtained by pyrolysis of naphtha and including vinyltoluene, indene and methylindene as main monomers. Here, other components in the aromatic fraction include styrene and styrene homologs such as α-methylstyrene and β-methylstyrene. The aromatic resin may contain a coumarone unit. The aromatic resin may contain at least one of an aliphatic olefin unit, a phenol unit and a cresol unit.

Examples of the aromatic resins include coumarone indene resins, indene resins, aromatic vinyl polymers (resins obtained by polymerizing α-methylstyrene and/or styrene), and C9 hydrocarbon resins. Among these, coumarone indene resins are preferred because they allow the effect of the present invention to be favorably achieved. Namely, coumarone indene resins having the softening point mentioned above are preferred.

The coumarone indene resins refer to resins each containing coumarone and indene as the monomer component forming the skeleton (backbone) of the resin. Examples of the monomer component other than coumarone and indene contained in the skeleton include styrene, α-methylstyrene, methylindene and vinyltoluene.

Examples of the terpene resins include polyterpene resins and terpene phenol resins. Polyterpene resins are preferred. Namely, the liquid terpene resin is preferably a liquid polyterpene resin (polyterpene resin having the softening point mentioned above).

The polyterpene resins include resins obtained by polymerizing terpene compounds, as well as hydrogenated products thereof. The terpene compounds include hydrocarbons represented by the formula $(C_5H_8)_n$ and oxygen-containing derivatives thereof. The terpene compounds have basic skeletons of terpenes which are classified into monoterpene $(C_{10}H_{16})$, sesquiterpene $(C_{15}H_{24})$, diterpene $(C_{20}H_{32})$ and the like. Examples of the terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene resins include terpene resins prepared from the terpene compounds described above as raw materials, such as α-pinene resins, β-pinene resins, limonene resins, dipentene resins and β-pinene/limonene resins, as well as hydrogenated terpene resins obtained by hydrogenating the terpene resins. Among these, limonene resins are preferred because of their excellent grip performance.

Examples of the terpene phenol resins include resins prepared from the terpene compound and a phenol compound as raw materials. Specific examples thereof include resins obtained by condensation of the terpene compound, a phenol compound and formalin. Examples of the phenol compound include phenol, bisphenol A, cresol and xylenol.

Examples of the rosin resins include a variety of known rosin resins such as raw rosins such as gum rosin, wood rosin and tall oil rosin; disproportionated products of raw rosins; stabilized rosins obtained by hydrogenating raw rosins; rosins such as polymerized rosins, as well as esterified rosins (rosin ester resins), phenol-modified rosins, unsaturated acid-modified rosins (e.g. maleic acid-modified rosin), and formylated rosins obtained by reducing rosins.

The content of the liquid resin is preferably 0.5 parts by mass or more, and more preferably 1 part by mass or more, per 100 parts by mass of the rubber component. At a content of less than 0.5 parts by mass, the effects of improving fuel economy, elongation at break and abrasion resistance may not be sufficiently obtained. The content is preferably 20 parts by mass or less, more preferably 10 parts by mass or less, and still more preferably 5 parts by mass or less, per 100 parts by mass of the rubber component. At a content of more than 20 parts by mass, the complex modulus (E*) and hardness may be reduced.

The rubber composition according to the present invention preferably contains at least one resin selected from the group consisting of a terpene resin having a softening point of 46 to 160° C., a rosin resin having a softening point of 46 to 140° C., a C5 petroleum resin having a softening point of 46 to 140° C., and an aromatic resin having a softening point of 46 to 140° C. Although the present invention uses a relatively large amount of BR which can cause a reduction in wet grip performance, the addition of these resins ensures good wet grip performance, and therefore the fuel economy, wet grip performance, elongation at break and abrasion resistance can be more favorably improved. The reason is presumed as follows: these resins are distributed in the form of spheres of 100 nm to 1 μm in the rubber composition, and therefore when the tires grip, these resins provide a physical grip (for example, a spike effect, or an adhesive tape effect obtained by melting of the resins when the road surface has a high temperature).

The resin(s) selected from the group mentioned above is preferably the terpene resin or aromatic resin. The terpene resin is highly effective in improvement in wet grip performance and fuel economy, while the aromatic resin is highly effective in improvement in wet grip performance.

The total content of the resin(s) selected from the group mentioned above is preferably 1 part by mass or more, more preferably 3 parts by mass or more, and still more preferably 7 parts by mass or more, per 100 parts by mass of the rubber component. The total content is preferably 20 parts by mass or less, more preferably 15 parts by mass or less, and still more preferably 12 parts by mass or less. At a total content in the range, the fuel economy, wet grip performance, elongation at break and abrasion resistance can be more favorably improved.

The terpene resin having a softening point of 46 to 160° C. is only different from the liquid terpene resin mentioned earlier with respect to its softening point. The terpene resin may suitably be a polyterpene resin or a terpene phenol resin, more suitably a terpene phenol resin.

The polyterpene resin is preferably a limonene resin because of its excellent grip performance. In the present invention, the terpene resin (polyterpene resin, terpene phenol resin) may contain, in addition to the terpene compound, a small amount of other monomers such as α-methylstyrene as the monomer component. For example, the terpene phenol resins include resins prepared from the terpene compound, the phenol compound and a small amount of α-methylstyrene as the monomer component.

The softening point of the terpene resin is 46° C. or more, preferably 80° C. or more, and more preferably 100° C. or more. At a softening point of less than 46° C., the effect of improving grip performance may be reduced. The softening point is 160° C. or less, preferably 135° C. or less. At a softening point of more than 160° C., the dispersibility of the resin may be reduced and therefore the elongation at break and abrasion resistance may be reduced.

In the case where only the terpene resin is used as the resin(s) selected from the group above, the preferred amount of the terpene resin compounded is the same as the total content of the resin(s) selected from the group above.

The rosin resin having a softening point of 46 to 140° C. is only different from the liquid rosin resin mentioned earlier with respect to its softening point. The rosin resin is preferably gum rosin because then fuel economy, wet grip performance, elongation at break and abrasion resistance can be obtained in a balanced manner.

The softening point of the rosin resin is 46° C. or more, preferably 50° C. or more, and more preferably 55° C. or more. At a softening point of less than 46° C., the effect of improving grip performance may be reduced. The softening point is 140° C. or less, preferably 100° C. or less, and more preferably 80° C. or less. At a softening point of more than 140° C., the dispersibility of the resin may be reduced and therefore the elongation at break and abrasion resistance may be reduced.

In the case where only the rosin resin is used as the resin(s) selected from the group above, the preferred amount of the rosin resin compounded is the same as the total content of the resin(s) selected from the group above.

Examples of the C5 petroleum resin having a softening point of 46 to 140° C. include aliphatic petroleum resins prepared from, as main raw materials, olefins and diolefins in the C5 fraction obtained by naphtha cracking.

The softening point of the C5 petroleum resin is 46° C. or more, preferably 60° C. or more, and more preferably 80° C. or more. At a softening point of less than 46° C., the effect of improving grip performance may be reduced. The softening point is 140° C. or less, preferably 120° C. or less. At a softening point of more than 140° C., the dispersibility of the resin may be reduced and therefore the elongation at break and abrasion resistance may be reduced.

In the case where only the C5 petroleum resin is used as the resin(s) selected from the group above, the preferred amount of the C5 petroleum resin compounded is the same as the total content of the resin(s) selected from the group above.

The aromatic resin having a softening point of 46 to 140° C. refers to a resin obtained by polymerization of a C8-C10 aromatic fraction generally obtained by pyrolysis of naphtha and including vinyltoluene, indene and methylindene as main monomers, provided that the resin has a softening point of 46 to 140° C. Here, other components in the aromatic fraction include styrene and styrene homologs such as α-methylstyrene and β-methylstyrene. The aromatic resin may contain a coumarone unit. The aromatic resin may contain at least one of an aliphatic olefin unit, a phenol unit and a cresol unit.

The softening point of the aromatic resin is 46° C. or more, preferably 60° C. or more, more preferably 70° C. or more, still more preferably 80° C. or more, and particularly preferably 90° C. or more. At a softening point of less than 46° C., the effect of improving grip performance may be reduced. The softening point is 140° C. or less, preferably 130° C. or less. At a softening point of more than 140° C., the dispersibility of the resin may be reduced and therefore the elongation at break and abrasion resistance may be reduced.

Examples of the aromatic resin include coumarone indene resins, indene resins, aromatic vinyl polymers (resins obtained by polymerizing α-methylstyrene and/or styrene), and C9 hydrocarbon resins. Among these, coumarone indene resins, indene resins and aromatic vinyl polymers are preferred, and coumarone indene resins and aromatic vinyl polymers are more preferred, because then fuel economy, wet grip performance, elongation at break and abrasion resistance can be obtained in a balanced manner. Use of a coumarone indene resin in combination with an aromatic vinyl polymer is also preferred.

The coumarone indene resin, mentioned as the aromatic resin, is only different from the liquid coumarone indene resin mentioned earlier with respect to its softening point. In the case where only the coumarone indene resin, mentioned as the aromatic resin, is used as the resin(s) selected from the group above, the preferred amount of the coumarone indene resin compounded is the same as the total content of the resin(s) selected from the group above.

The aromatic vinyl polymer is formed from styrene and/or α-methylstyrene as the aromatic vinyl monomer (unit). The aromatic vinyl polymer may be any of a homopolymer of each of these monomers, and a copolymer of these two monomers. The aromatic vinyl polymer is preferably a homopolymer of α-methylstyrene or styrene, or a copolymer of α-methylstyrene and styrene, and more preferably a copolymer of α-methylstyrene and styrene, because they are economical, easy to process, and superior in wet grip performance.

As the aromatic vinyl polymer, commercially available products such as SYLVARES SA85, SA100, SA120 and SA140 made by Arizona Chemical, and R2336 made by Eastman Chemical Company can be suitably used.

The softening point of the aromatic vinyl polymer is 46° C. or more, preferably 60° C. or more, and more preferably 70° C. or more. At a softening point of less than 46° C., the wet grip performance may be reduced. The softening point is 140° C. or less, preferably 100° C. or less. At a softening point of more than 140° C., the fuel economy may be poor.

Here, the softening point of the terpene resin, the rosin resin, the C5 petroleum resin, the aromatic resin and the aromatic vinyl polymer refers to a temperature at which a ball drops in measurement of the softening point specified in JIS K 6220-1:2001 with a ring and ball softening point measuring apparatus.

In the case where only the aromatic vinyl polymer is used as the resin(s) selected from the group above, the preferred amount of the aromatic vinyl polymer compounded is the same as the total content of the resin(s) selected from the group above.

The rubber composition according to the present invention preferably contains a combination of a liquid coumarone indene resin having a softening point of −20 to 45° C. and an aromatic resin having a softening point of 46 to 140° C., more preferably a combination of a liquid coumarone indene resin having a softening point of −20 to 45° C., a coumarone indene resin having a softening point of 46 to 140° C. and an aromatic vinyl polymer having a softening point of 46 to 140° C., or a combination of a liquid coumarone indene resin having a softening point of −20 to 45° C., a coumarone indene resin having a softening point of 46 to 140° C. and a terpene resin having a softening point of 46 to 160° C. (preferably a terpene phenol resin) because they allow the effect of the present invention to be more favorably achieved.

The content of zinc oxide is preferably 0.5 parts by mass or more, more preferably 1.2 parts by mass or more, and still more preferably 1.5 parts by mass or more, per 100 parts by mass of the rubber component. At a content of less than 0.5 parts by mass, satisfactory fuel economy, elongation at break, and viscosity in the processing (processability) tend not to be obtained. The content of zinc oxide is preferably 2.9 parts by mass or less, and more preferably 2.7 parts by mass or less, per 100 parts by mass of the rubber component. At a content of more than 2.9 parts by mass, satisfactory abrasion resistance tends not to be obtained.

The rubber composition according to the present invention may appropriately contain, in addition to the components mentioned above, compounding agents generally used in the preparation of a rubber composition, including processing aids such as stearic acid and fatty acid metal salts, a variety of antioxidants, wax, oil, vulcanizing agents, and vulcanization accelerators.

The total content of oil, the liquid resin and the resin(s) selected from the group above is preferably 2 to 35 parts by mass, and more preferably 15 to 30 parts by mass, per 100 parts by mass of the rubber component because then a sufficient effect of the present invention can be obtained.

The rubber composition according to the present invention can be prepared by an ordinary method. Specifically, the rubber composition can be prepared by, for example, a method including kneading the components with a Banbury mixer, a kneader, an open roll mill or the like, and then vulcanizing the mixture. The rubber composition can be suitably used for treads for tires.

More specifically, the rubber component, silica, carbon black, a silane coupling agent and the like are kneaded until the kneading temperature reaches 120 to 180° C. (preferably 130 to 175° C.) (base kneading step). Next, a vulcanizing agent such as sulfur, a vulcanization accelerator and the like are added to the mixture, and they are kneaded until the kneading temperature reaches 50 to 120° C. (preferably 70 to 120° C.) (final kneading step). Then the kneaded mixture is vulcanized, whereby the rubber composition according to the present invention can be prepared. Preferably, the base kneading step is performed in two stages or more. Further, in each stage in the base kneading step, silica and a silane coupling agent are preferably added in divided portions and kneaded. More preferably, the rubber component, carbon black, a portion of silica and a portion of a silane coupling agent are kneaded in the first stage of the base kneading step before the rest of the chemicals are added and kneaded in a subsequent stage or stages. For example, in the case where the base kneading step consists of two stages, total amounts of the rubber component and carbon black, a half of the total amount of silica and a half of the total amount of a silane coupling agent may be introduced and kneaded in the first stage, and then the remaining amounts of silica and silane coupling agent and other chemicals may be added to the kneaded mixture obtained in the first stage, and kneaded in the second stage. In this manner, the dispersibility of silica can be further improved.

The pneumatic tire according to the present invention can be prepared from the rubber composition by an ordinary method.

Specifically, the rubber composition containing the components mentioned above, before vulcanization, is extruded and processed into the shape of a tire component such as a tread, and then molded together with other tire components in an ordinary manner in a tire building machine to form an unvulcanized tire. The unvulcanized tire is heated and pressurized in a vulcanizer to obtain a tire.

The pneumatic tire according to the present invention can be used as a tire for passenger vehicles, a tire for trucks and buses, a tire for sport utility vehicles (SUV), a racing tire, and the like. Among these, the pneumatic tire can be suitably used as a tire for passenger vehicles and a tire for sport utility vehicles.

EXAMPLES

The present invention will be more specifically described referring to examples, but the present invention is not be limited only to these.

Hereinafter, chemicals used in Examples and Comparative Examples will be summarized.

NR: TSR20

BR1: CB25 made by Lanxess (BR synthesized with Nd catalyst (Nd BR), cis content: 97% by mass, vinyl content: 0.7% by mass, Mw/Mn: 1.78, Mw: 500,000, Mn: 280,000)

BR2: BR150B made by Ube Industries, Ltd. (BR synthesized with Co catalyst (Co BR), cis content: 96% by mass, vinyl content: 2.1% by mass, Mw/Mn: 2.30, Mw: 440,000, Mn: 190,000)

Modified BR1 for silica: N103 made by Asahi Kasei Chemicals Corporation (end-modified BR polymerized with a lithium initiator and having a polymerizing end modified with a mixture of tetraglycidyl-1,3-bisaminomethylcyclohexane and its oligomer component, vinyl content: 12% by mass, cis content: 38% by mass, trans content: 50% by mass, Mw/Mn: 1.19, Mw: 550,000)

Modified BR2 for silica: the modified butadiene rubber (S-modified BR) SE 1701 made by Sumitomo Chemical Co., Ltd. (end-modified BR polymerized with a lithium initiator and having a polymerizing end modified with a compound represented by the formula (1) (wherein $R^1$, $R^2$ and $R^3$=—$OCH_3$, $R^4$ and $R^5$=—$CH_2CH_3$, and n=3), vinyl content: 26% by mass, cis content: 30% by mass, trans content: 44% by mass, Mw/Mn: 1.34, Mw: 670,000)

Modified BR for CB: BR1250H made by ZEON Corporation (tin-modified BR polymerized with a lithium initiator (modified BR for carbon black), vinyl content: 10% by mass, cis content: 40% by mass, trans content: 50% by mass, Mw/Mn: 1.40, Mw: 460,000, Mn: 330,000, tin atom content: 250 ppm)

Modified SBR1 for silica: HPR355 made by JSR CORPORATION (modified S-SBR, bound styrene content: 27% by mass, coupled and end-modified with alkoxysilane, modified S-SBR having a polymerizing end modified with a compound represented by the formula (1))

Modified SBR2 for silica: HPR357 made by JSR CORPORATION (modified S-SBR, bound styrene content: 37% by mass, coupled and end-modified with alkoxysilane, modified S-SBR having a polymerizing end modified with a compound represented by the formula (1))

E-SBR: SBR1723 made by JSR CORPORATION (bound styrene content: 23.5% by mass)

Carbon black 1: SHOBLACK N220 made by Cabot Japan K.K. (N2SA: 114 $m^2/g$)

Carbon black 2: SHOBLACK N330 made by Cabot Japan K.K. ($N_2SA$: 78 $m^2/g$)

Carbon black 3: prototype 8 made by Mitsubishi Chemical Corporation ($N_2SA$: 231 $m^2/g$)

Carbon black 4: prototype 11 made by Mitsubishi Chemical Corporation ($N_2SA$: 269 $m^2/g$)

Carbon black 5: HP160 made by Columbia Carbon ($N_2SA$: 165 $m^2/g$)

Silica 1: Zeosil 1085Gr made by Rhodia ($N_2SA$: 90 $m^2/g$)

Silica 2: Zeosil 1115Gr made by Rhodia ($N_2SA$: 115 $m^2/g$)

Silica 3: Zeosil 1165 MP made by Rhodia ($N_2SA$: 165 $m^2/g$)

Silica 4: ULTRASIL VN3 made by Evonik Degussa ($N_2SA$: 175 $m^2/g$)

Silica 5: Zeosil Premium 200 MP made by Rhodia ($N_2SA$: 215 $m^2/g$)

Silica 6: U9000Gr made by Evonik Degussa ($N_2SA$: 235 $m^2/g$)

Silica 7: a prototype made by Tokuyama Corporation ($N_2SA$: 260 $m^2/g$)

Silica 8: a prototype made by Tokuyama Corporation ($N_2SA$: 280 $m^2/g$)

Coumarone indene resin 1: NOVARES C10 made by Rutgers Chemicals (liquid coumarone indene resin, softening point: 5 to 15° C.)
Coumarone indene resin 2: NOVARES C30 made by Rutgers Chemicals (liquid coumarone indene resin, softening point: 20 to 30° C.)
Coumarone indene resin 3: NOVARES C80 made by Rutgers Chemicals (coumarone indene resin, softening point: 75 to 85° C.)
Coumarone indene resin 4: NOVARES C100 made by Rutgers Chemicals (coumarone indene resin, softening point: 95 to 105° C.)
Coumarone indene resin 5: NOVARES C120 made by Rutgers Chemicals (coumarone indene resin, softening point: 115 to 125° C.)
Aromatic vinyl polymer: Sylvares SA85 made by Arizona Chemical (copolymer of α-methylstyrene and styrene, softening point: 85° C., Mw: 1000)
Polyterpene resin: Sylvares TR5147 made by Arizona Chemical (polyterpene resin (limonene resin), softening point: 115° C.)
Terpene phenol resin: Sylvares TP115 made by Arizona Chemical (terpene phenol resin, softening point: 115° C., hydroxyl value: 50 KOHmg/g)
Gum rosin resin: Chinese gum rosin WW made by ARAKAWA CHEMICAL INDUSTRIES, LTD. (gum rosin resin, softening point: 60° C.)
Petroleum C5 resin: Marukarez resin T-100AS made by Maruzen Petrochemical Co., Ltd. (C5 petroleum resin, softening point: 102° C.)
Petroleum C9 resin: TT120 made by Rutgers Chemicals (C9 hydrocarbon resin, softening point: 120° C.)
TDAE: VIVATEC 500 made by H&R
Wax: Ozoace 0355 made by NIPPON SEIRO CO., LTD.
Antioxidant: Antigene 6C made by Sumitomo Chemical Co., Ltd. (N-(1,3-dimethylbutyl)-N'-phenyl-p-phenylenediamine)
TMQ: NOCRAC 224 made by Ouchi Shinko Chemical Industrial Co., Ltd.
Stearic acid: stearic acid "Tsubaki" made by NOF CORPORATION
Zinc oxide: Ginrei R made by TOHO ZINC CO., LTD.
Silane coupling agent: Si75 made by Evonik Degussa (bis(3-triethoxysilylpropyl)disulfide)
5% Oil-containing powder sulfur: HK-200-5 made by Hosoi Chemical Industry Co., Ltd.
TBBS: NOCCELER NS-G made by Ouchi Shinko Chemical Industrial Co., Ltd. (N-tert-butyl-2-benzothiazolylsulfeneamide)
DPG: NOCCELER D made by Ouchi Shinko Chemical Industrial Co., Ltd. (diphenylguanidine)

Examples and Comparative Examples

According to each of the compounding formulations shown in Tables 1 and 2, the rubber component, a half of the total amount of silica, a total amount of carbon black and a half of the total amount of the silane coupling agent were kneaded in a 1.7 L Banbury mixer until the kneading temperature reached 150° C., to prepare a kneaded mixture 1. Next, the obtained kneaded mixture 1, the remaining amounts of silica and the silane coupling agent, and the chemicals other than the sulfur and vulcanization accelerators were kneaded in a 1.7 L Banbury mixer until the kneading temperature reached 150° C., to prepare a kneaded mixture 2. Next, the sulfur and vulcanization accelerators were added to the obtained kneaded mixture 2, and they were kneaded with an open roll mill until the kneading temperature reached 105° C., to prepare an unvulcanized rubber composition.

The obtained unvulcanized rubber composition was press vulcanized at 170° C. for 12 minutes to obtain a vulcanized rubber composition.

Moreover, the obtained unvulcanized rubber composition was molded into the shape of a tread, and assembled with other tire components in a tire building machine. The assembly was press vulcanized at 170° C. for 12 minutes to obtain a test tire (tire size: 245/40R18).

The thus obtained vulcanized rubber compositions and test tires were evaluated as follows. The test results are shown in Tables 1 and 2.

(Viscoelasticity Test)

Using a viscoelasticity spectrometer VES made by Iwamoto Seisakusho Co., Ltd., the complex modulus E* (MPa) and the loss tangent tan δ of the vulcanized rubber composition were measured at a temperature of 40° C., a frequency of 10 Hz, an initial strain of 10% and a dynamic strain of 2%. A larger value of E* indicates higher rigidity and therefore higher handling stability. A lower value of tan δ indicates lower heat build-up and therefore higher fuel economy. The value of tan δ was also expressed as an index relative to the value of tan δ in Comparative Example 1 taken as 100. A larger index value indicates higher fuel economy.

(Wet Grip Performance)

The test tires were mounted on a front wheel drive car (displacement: 2000 cc) made in Japan. A test driver drove the car around the track 10 times in a test course with a wet asphalt surface. Then the test driver evaluated the control stability during steering of the car. The results were expressed as an index relative to that in Comparative Example 1 taken as 100. A larger index value indicates higher wet grip performance.

(Abrasion Resistance)

The test tires were mounted on a front wheel drive car (displacement: 2000 cc) made in Japan. A test driver drove the car in a test course with a dry asphalt surface. After the driving, the remaining groove depth of the tire tread rubber (initial depth: 8.0 mm) was measured and evaluated as abrasion resistance. A larger remaining groove depth indicates higher abrasion resistance. The remaining groove depth was expressed as an index relative to that in Comparative Example 1 taken as 100. A larger index value indicates higher abrasion resistance.

(Tensile Test)

A No. 3 dumbbell-shaped test piece formed of the vulcanized rubber composition was subjected to a tensile test at room temperature according to JIS K 6251 "Rubber, vulcanized or thermoplastics—Determination of tensile stress-strain properties," to measure the elongation at break EB (%). A larger value of EB indicates higher elongation at break (durability).

TABLE 1

| | | | Example | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Amount (part(s) by mass) | NR | NR | 35 | — | — | — | — | — | — | — | — | — | — | — | 15 |
| | BR | BR1 | — | 35 | 35 | 35 | 35 | 45 | 35 | 35 | 35 | 55 | 30 | 45 | 35 |
| | | BR2 | — | — | — | — | — | — | — | — | — | — | — | — | — |
| | | Modified BR1 for silica | 20 | 20 | 20 | 20 | 20 | 20 | 20 | 20 | 20 | 20 | 15 | — | 20 |
| | | Modified BR2 for silica | — | — | — | — | — | — | — | — | — | — | — | — | — |
| | | Modified BR for CB | — | — | — | — | — | — | — | — | — | — | — | — | — |
| | | Total BR | 55 | 55 | 55 | 55 | 55 | 65 | 55 | 55 | 55 | 75 | 45 | 45 | 55 |
| | SBR | Modified SBR1 for silica | 45 | 45 | 45 | 45 | 45 | 35 | 45 | 45 | 45 | 25 | 55 | 55 | 30 |
| | | Modified SBR2 for silica | — | — | — | — | — | — | — | — | — | — | — | — | — |
| | | E-SBR | — | — | — | — | — | — | — | — | — | — | — | — | — |
| | | Total SBR | 45 | 45 | 45 | 45 | 45 | 35 | 45 | 45 | 45 | 25 | 55 | 55 | 30 |
| | CB | Carbon black 1 (114 m²/g) | — | — | — | — | 15 | 15 | — | 10 | — | — | — | — | — |
| | | Carbon black 2 (78 m²/g) | — | — | — | — | — | — | — | — | — | — | — | — | — |
| | | Carbon black 3 (231 m²/g) | — | — | — | 20 | — | — | — | — | — | — | — | — | — |
| | | Carbon black 4 (269 m²/g) | — | — | — | — | — | — | — | — | — | — | — | — | — |
| | | Carbon black 5 (165 m²/g) | 25 | 25 | 25 | — | 25 | 33 | 15 | 15 | 25 | 25 | 30 | 30 | 25 |
| | | Total CB | 25 | 25 | 25 | 25 | 40 | 48 | 15 | 25 | 25 | 25 | 30 | 30 | 25 |
| | | Total CB/Total BR | 0.455 | 0.455 | 0.455 | 0.455 | 0.727 | 0.738 | 0.273 | 0.455 | 0.455 | 0.333 | 0.667 | 0.667 | 0.455 |
| | Silica | Silica 1 (90 m²/g) | — | — | — | 20 | — | — | — | — | — | — | — | — | — |
| | | Silica 2 (115 m²/g) | — | — | 60 | — | — | — | — | — | — | — | — | — | — |
| | | Silica 3 (165 m²/g) | — | 60 | — | 40 | 45 | 40 | 70 | 70 | 90 | 60 | 55 | 55 | 60 |
| | | Silica 4 (175 m²/g) | 60 | — | — | — | — | — | — | — | — | — | — | — | — |
| | | Silica 5 (215 m²/g) | — | — | — | — | — | — | — | — | — | — | — | — | — |
| | | Silica 6 (235 m²/g) | — | — | — | — | — | — | — | — | — | — | — | — | — |
| | | Silica 7 (260 m²/g) | — | — | — | — | — | — | — | — | — | — | — | — | — |
| | | Silica 8 (280 m²/g) | — | — | — | — | — | — | — | — | — | — | — | — | — |
| | | Total silica | 60 | 60 | 60 | 60 | 45 | 40 | 70 | 70 | 90 | 60 | 55 | 55 | 60 |
| | | Total silica/Total SBR | 1.333 | 1.333 | 1.333 | 1.333 | 1.000 | 1.143 | 1.556 | 1.556 | 2.000 | 2.400 | 1.000 | 1.000 | 2.000 |
| | Resin | Coumarone indene resin 1 | 2 | 2 | 2 | 2 | 2 | 2 | 2 | 2 | 2 | 2 | 2 | 2 | 2 |
| | | Coumarone indene resin 2 | 4 | 4 | 4 | 4 | 4 | 4 | 4 | 4 | 4 | 4 | 4 | 4 | 4 |
| | | Coumarone indene resin 3 | — | — | — | — | — | — | — | — | — | — | — | — | — |
| | | Coumarone indene resin 4 | 6 | 6 | 6 | 6 | 6 | 6 | 6 | 6 | 6 | 6 | 6 | 6 | 6 |
| | | Coumarone indene resin 5 | — | — | — | — | — | — | — | — | — | — | — | — | — |
| | | Aromatic vinyl polymer | — | — | — | — | — | 12 | — | — | — | — | — | — | — |
| | | Polyterpene resin | — | — | — | — | — | — | — | — | — | — | — | — | — |
| | | Terpene phenol resin | — | — | — | — | — | — | — | — | — | — | — | — | — |
| | | Gum rosin resin | — | — | — | — | — | — | — | — | — | — | — | — | — |
| | | Petroleum C5 Resin | — | — | — | — | — | — | — | — | — | — | — | — | — |
| | | Petroleum C9 Resin | — | — | — | — | — | — | — | — | — | — | — | — | — |
| | Oil | TDAE | 12 | 12 | 12 | 12 | 12 | 6 | 12 | 12 | 12 | 12 | 12 | 12 | 12 |
| | Others | Wax | 1.5 | 1.5 | 1.5 | 1.5 | 1.5 | 1.5 | 1.5 | 1.5 | 1.5 | 1.5 | 1.5 | 1.5 | 1.5 |
| | | Antioxidant | 3 | 3 | 3 | 3 | 3 | 3 | 3 | 3 | 3 | 3 | 3 | 3 | 3 |
| | | TMQ | 1 | 1 | 1 | 1 | 1 | 1 | 1 | 1 | 1 | 1 | 1 | 1 | 1 |

TABLE 1-continued

| | | | Example | | | | | | | | | | | | |
|---|---|---|---|---|---|---|---|---|---|---|---|---|---|---|---|
| | | | 14 | 15 | 16 | 17 | 18 | 19 | 20 | 21 | 22 | 23 | 24 | 25 | 26 |
| Evaluation results | Stearic acid | | 3 | 3 | 3 | 3 | 3 | 3 | 3 | 3 | 3 | 3 | 3 | 3 | 3 |
| | Zinc oxide | | 2.5 | 2.5 | 2.5 | 2.5 | 2.5 | 2.5 | 2.5 | 2.5 | 2.5 | 2.5 | 2.5 | 2.5 | 2.5 |
| | Silane coupling agent | | 4.8 | 4.8 | 4.8 | 4.8 | 3.6 | 3.6 | 5.6 | 5.6 | 7.2 | 4.8 | 4.8 | 4.8 | 4.8 |
| | 5% Oil-containing powder sulfur | | 1.5 | 1.5 | 1.5 | 1.5 | 1.5 | 1.5 | 1.5 | 1.5 | 1.2 | 1.5 | 1.5 | 1.5 | 1.5 |
| | TBBS | | 1.5 | 1.5 | 1.5 | 1.5 | 2 | 2 | 2 | 2 | 2 | 2 | 2 | 2 | 1.5 |
| | DPG | | 1.5 | 1.5 | 1.5 | 1.5 | 2 | 2 | 2 | 2 | 2 | 2 | 2 | 2 | 1.5 |
| | E* (40° C. 2% amplitude) | Target: 7.5–9.5 | 8.5 | 8.95 | 8.88 | 8.71 | 9.1 | 9.4 | 8.41 | 8.25 | 8.55 | 7.92 | 8.72 | 8.91 | 8.24 |
| | tan δ (40° C.) | Target: ≤0.25 | 0.202 | 0.215 | 0.235 | 0.195 | 0.239 | 0.230 | 0.192 | 0.194 | 0.25 | 0.181 | 0.225 | 0.249 | 0.192 |
| | Index of tan δ | Relative to Comparative Example 1 | 121 | 115 | 108 | 124 | 106 | 107 | 125 | 124 | 102 | 129 | 112 | 102 | 125 |
| | Index of wet grip performance | Target: ≥100 | 110 | 115 | 110 | 120 | 100 | 100 | 100 | 110 | 125 | 100 | 115 | 100 | 115 |
| | Index of abrasion resistance | Target: ≥110 | 150 | 165 | 145 | 150 | 175 | 170 | 135 | 135 | 155 | 170 | 135 | 110 | 130 |
| | Average of three indexes (abrasion resistance weighted with a weight of 3) | Target: >105 | 136 | 145 | 131 | 139 | 146 | 143 | 126 | 128 | 138 | 148 | 126 | 106 | 126 |
| | Elongation at break (EB) % | Target: >450 | 505 | 505 | 475 | 525 | 500 | 490 | 525 | 495 | 545 | 460 | 500 | 475 | 535 |
| Amount (part(s) by mass) | NR | NR | 15 | — | — | — | — | — | — | — | — | — | — | — | — |
| | BR | BR1 | 20 | 55 | — | 35 | 35 | 35 | 25 | 35 | 50 | 35 | 35 | 35 | 35 |
| | | BR2 | — | — | 35 | — | — | — | — | — | — | — | — | — | — |
| | | Modified BR1 for silica | 20 | — | 20 | — | — | 20 | 30 | 20 | 15 | 20 | 20 | 20 | 20 |
| | | Modified BR2 for silica | — | — | — | 20 | — | — | — | — | — | — | — | — | — |
| | | Modified BR for CB | — | — | — | — | 20 | — | — | — | — | — | — | — | — |
| | | Total BR | 40 | 55 | 55 | 55 | 55 | 55 | 55 | 55 | 65 | 55 | 55 | 55 | 55 |
| | SBR | Modified SBR1 for silica | 45 | 45 | 45 | 45 | 45 | — | — | 25 | 35 | 45 | 45 | 45 | 45 |
| | | Modified SBR2 for silica | — | — | — | — | — | 45 | — | — | — | — | — | — | — |
| | | E-SBR | — | — | — | — | — | — | 45 | 20 | — | — | — | — | — |
| | | Total SBR | 45 | 45 | 45 | 45 | 45 | 45 | 45 | 45 | 35 | 45 | 45 | 45 | 45 |
| | CB | Carbon black 1 (114 m²/g) | 25 | 25 | 25 | 25 | 25 | 25 | 25 | 25 | 17 | 25 | 25 | 25 | 25 |
| | | Carbon black 2 (78 m²/g) | — | — | — | — | — | — | — | — | — | — | — | — | — |
| | | Carbon black 3 (231 m²/g) | — | — | — | — | — | — | — | — | — | — | — | — | — |
| | | Carbon black 4 (269 m²/g) | — | — | — | — | — | — | — | — | — | — | — | — | — |
| | | Carbon black 5 (165 m²/g) | — | — | — | — | — | — | — | — | — | — | — | — | — |
| | | Total CB | 25 | 25 | 25 | 25 | 25 | 25 | 25 | 25 | 17 | 25 | 25 | 25 | 25 |
| | | Total CB/Total BR | 0.625 | 0.455 | 0.455 | 0.455 | 0.455 | 0.455 | 0.455 | 0.455 | 0.262 | 0.455 | 0.455 | 0.455 | 0.455 |
| | Silica | Silica 1 (90 m²/g) | — | — | — | — | — | — | — | — | — | — | — | — | — |
| | | Silica 2 (115 m²/g) | — | — | — | — | — | — | — | — | — | — | — | — | — |
| | | Silica 3 (165 m²/g) | — | — | — | — | — | — | 50 | — | — | — | — | — | — |
| | | Silica 4 (175 m²/g) | 60 | 60 | 60 | 60 | 60 | 60 | — | 60 | 78 | 60 | 60 | 60 | 60 |
| | | Silica 5 (215 m²/g) | — | — | — | — | — | — | — | — | — | — | — | — | — |
| | | Silica 6 (235 m²/g) | — | — | — | — | — | — | — | — | — | — | — | — | — |
| | | Silica 7 (260 m²/g) | — | — | — | — | — | — | — | — | — | — | — | — | — |
| | | Silica 8 (280 m²/g) | — | — | — | — | — | — | — | — | — | — | — | — | — |
| | | Total silica | 60 | 60 | 60 | 60 | 60 | 60 | 50 | 60 | 78 | 60 | 60 | 60 | 60 |
| | | Total silica/Total SBR | 1.333 | 1.333 | 1.333 | 1.333 | 1.333 | 1.333 | 1.111 | 1.333 | 2.229 | 1.333 | 1.333 | 1.333 | 1.333 |

TABLE 1-continued

| | | | | | | | | | | | | | | | |
|---|---|---|---|---|---|---|---|---|---|---|---|---|---|---|---|
| Resin | Coumarone indene resin 1 | 2 | 2 | 2 | 2 | 2 | 2 | 2 | 2 | 2 | 2 | 2 | 2 | 2 |
| | Coumarone indene resin 2 | — | — | — | — | — | — | — | — | — | — | — | — | — |
| | Coumarone indene resin 3 | — | — | — | — | — | — | — | — | — | — | — | — | — |
| | Coumarone indene resin 4 | 4 | 4 | 4 | 4 | 4 | 4 | 4 | 4 | 4 | — | 4 | 4 | — |
| | Coumarone indene resin 5 | — | — | — | — | — | — | — | — | — | — | — | — | — |
| | Aromatic vinyl polymer | 6 | 6 | 6 | 6 | 6 | 6 | 6 | 6 | 6 | 6 | — | — | — |
| | Polyterpene resin | — | — | — | — | — | — | — | — | — | — | — | — | 12 |
| | Terpene phenol resin | — | — | — | — | — | — | — | — | — | — | 6 | 6 | — |
| | Gum rosin resin | — | — | — | — | — | — | — | — | — | — | — | — | — |
| | Petroleum C5 Resin | — | — | — | — | — | — | — | — | — | — | — | — | — |
| | Petroleum C9 Resin | — | — | — | — | — | — | — | — | — | — | — | — | — |
| Oil | TDAE | 12 | 12 | 12 | 12 | 12 | 12 | 12 | 12 | 12 | 18 | 12 | 12 | 12 |
| Others | Wax | 1.5 | 1.5 | 1.5 | 1.5 | 1.5 | 1.5 | 1.5 | 1.5 | 1.5 | 1.5 | 1.5 | 1.5 | 1.5 |
| | Antioxidant | 3 | 3 | 3 | 3 | 3 | 3 | 3 | 3 | 3 | 3 | 3 | 3 | 3 |
| | TMQ | 1 | 1 | 1 | 1 | 1 | 1 | 1 | 1 | 1 | 1 | 1 | 1 | 1 |
| | Stearic acid | 3 | 3 | 3 | 3 | 3 | 3 | 3 | 3 | 3 | 3 | 3 | 3 | 3 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 |
| | Silane coupling agent | 4.8 | 4.8 | 4.8 | 4.8 | 4.8 | 4.8 | 4.8 | 4.8 | 4.8 | 4.8 | 4.8 | 4.8 | 4.8 |
| | 5% Oil-containing powder sulfur | 1.5 | 1.5 | 1.5 | 1.5 | 1.5 | 1.5 | 1.5 | 1.5 | 1.2 | 1.5 | 1.5 | 1.5 | 1.5 |
| | TBBS | 1.5 | 1.5 | 1.5 | 1.5 | 1.5 | 1.5 | 1.5 | 1.5 | 1.5 | 1.5 | 1.5 | 1.5 | 1.5 |
| | DPG | 1.5 | 1.5 | 1.5 | 1.5 | 1.5 | 1.5 | 1.5 | 1.5 | 1.5 | 1.5 | 1.5 | 1.5 | 1.5 |
| Evaluation results | E* (40° C., 2% amplitude) Target: 7.5-9.5 | 8.45 | 9.05 | 8.22 | 8.45 | 7.85 | 8.65 | 8.31 | 8.89 | 8.44 | 7.75 | 8.22 | 8.62 | 8.66 |
| | tan δ (40° C.) Target: ≤0.25 | 0.215 | 0.235 | 0.219 | 0.205 | 0.195 | 0.232 | 0.249 | 0.245 | 0.229 | 0.207 | 0.198 | 0.199 | 0.221 |
| | Index of tan δ Relative to Comparative Example 1 | 116 | 108 | 114 | 120 | 124 | 109 | 102 | 104 | 110 | 119 | 122 | 122 | 113 |
| | Index of wet grip performance Target: ≥100 | 120 | 105 | 110 | 110 | 90 | 120 | 110 | 110 | 105 | 100 | 100 | 115 | 110 |
| | Index of abrasion resistance Target: ≥110 | 115 | 120 | 135 | 150 | 108 | 145 | 150 | 150 | 135 | 135 | 135 | 150 | 145 |
| | Average of three indexes (abrasion resistance weighted with a weight of 3) Target: >105 | 116 | 115 | 126 | 136 | 108 | 133 | 132 | 133 | 124 | 125 | 125 | 137 | 132 |
| | Elongation at break (EB) % Target: >450 | 545 | 475 | 480 | 500 | 465 | 505 | 525 | 510 | 540 | 465 | 480 | 525 | 475 |

TABLE 2

|  |  |  | | Comparative Examples | | | | | | | |
|---|---|---|---|---|---|---|---|---|---|---|---|
|  |  |  | | 1 | 2 | 3 | 4 | 5 | 6 | 7 | 8 |
| Amount (part(s) by mass) | NR | NR | | — | — | — | — | — | — | 25 | — |
|  | BR | BR1 | | 35 | 35 | 35 | 35 | 20 | 35 | 35 | 30 |
|  |  | BR2 | | — | — | — | — | — | — | — | — |
|  |  | Modified BR1 for silica | | — | 20 | 20 | 20 | 15 | 45 | 20 | — |
|  |  | Modified BR2 for silica | | — | — | — | — | — | — | — | — |
|  |  | Modified BR for CB | | — | — | — | — | — | — | — | — |
|  |  | Total BR | | 35 | 55 | 55 | 55 | 35 | 80 | 55 | 30 |
|  | SBR | Modified SBR1 for silica | | 65 | 45 | 45 | 45 | 55 | 20 | 20 | 70 |
|  |  | Modified SBR2 for silica | | — | — | — | — | — | — | — | — |
|  |  | E-SBR | | — | — | — | — | — | — | — | — |
|  |  | Total SBR | | 65 | 45 | 45 | 45 | 55 | 20 | 20 | 70 |
|  | CB | Carbon black 1 (114 m²/g) | | 10 | — | — | 35 | — | — | — | — |
|  |  | Carbon black 2 (78 m²/g) | | — | — | — | — | — | — | — | — |
|  |  | Carbon black 3 (231 m²/g) | | — | — | — | — | — | — | — | — |
|  |  | Carbon black 4 (269 m²/g) | | — | — | — | — | — | — | — | — |
|  |  | Carbon black 5 (165 m²/g) | | — | 5 | 60 | 20 | 25 | 25 | 25 | 25 |
|  |  | Total CB | | 10 | 5 | 60 | 55 | 25 | 25 | 25 | 25 |
|  |  | Total CB/Total BR | | 0.288 | 0.091 | 1.091 | 1.000 | 0.714 | 0.313 | 0.455 | 0.833 |
|  | Silica | Silica 1 (90 m²/g) | | — | — | — | — | — | — | — | — |
|  |  | Silica 2 (115 m²/g) | | — | — | — | — | — | — | — | — |
|  |  | Sgica 3 (165 m²/g) | | — | — | — | — | — | — | — | — |
|  |  | Silica 4 (175 m²/g) | | 75 | 80 | 25 | 40 | 60 | 60 | 60 | 60 |
|  |  | Silica 5 (215 m²/g) | | — | — | — | — | — | — | — | — |
|  |  | Silica 6 (235 m²/g) | | — | — | — | — | — | — | — | — |
|  |  | Silica 7 (260 m²/g) | | — | — | — | — | — | — | — | — |
|  |  | Slica 8 (280 m²/g) | | — | — | — | — | — | — | — | — |
|  |  | Total silica | | 75 | 80 | 25 | 40 | 60 | 60 | 60 | 60 |
|  |  | Total silica/Total SBR | | 1.154 | 1.778 | 0.556 | 0.889 | 1.091 | 3.000 | 3.000 | 0.857 |
|  | Resin | Coumarone indene resin 1 | | — | 2 | 2 | 2 | 2 | 2 | 2 | 2 |
|  |  | Coumarone indene resin 2 | | — | — | — | — | — | — | — | — |
|  |  | Coumarone indene resin 3 | | — | — | — | — | — | — | — | — |
|  |  | Coumarone indene resin 4 | | — | 4 | 4 | 4 | 4 | 4 | 4 | 4 |
|  |  | Coumarone indene resin 5 | | — | — | — | — | — | — | — | — |
|  |  | Aromatic vinyl polymer | | 12 | 6 | 6 | 6 | 6 | 6 | 6 | 6 |
|  |  | Polyterpene resin | | — | — | — | — | — | — | — | — |
|  |  | Terpene phenol resin | | — | — | — | — | — | — | — | — |
|  |  | Gum rosin resin | | — | — | — | — | — | — | — | — |
|  |  | Petroleum C5 Resin | | — | — | — | — | — | — | — | — |
|  |  | Petroleum C9 Resin | | — | — | — | — | — | — | — | — |
|  | Oil | TDAE | | 12 | 12 | 12 | 12 | 12 | 12 | 12 | 12 |
|  | Others | Wax | | 1.5 | 1.5 | 1.5 | 1.5 | 1.5 | 1.5 | 1.5 | 1.5 |
|  |  | Antioxidant | | 3 | 3 | 3 | 3 | 3 | 3 | 3 | 3 |
|  |  | TMQ | | 1 | 1 | 1 | 1 | 1 | 1 | 1 | 1 |
|  |  | Stearic acid | | 3 | 3 | 3 | 3 | 3 | 3 | 3 | 3 |
|  |  | Zinc oxide | | 2.5 | 2.5 | 2.5 | 2.5 | 2.5 | 2.5 | 2.5 | 2.5 |
|  |  | Silane coupling agent | | 6 | 6 | 2 | 3.2 | 4.8 | 4.8 | 4.8 | 4.8 |
|  |  | 5% Oil-containing powder sulfur | | 1.5 | 1.5 | 1.5 | 1.2 | 1.5 | 1.5 | 1.5 | 1.5 |
|  |  | TBBS | | 2 | 2 | 2 | 2 | 2 | 2 | 2 | 2 |
|  |  | DPG | | 2 | 2 | 2 | 2 | 2 | 2 | 2 | 2 |
| Evaluation results | | E* (40° C. 2% amplitude) | Target: 7.5-9.5 | 8.35 | 8.35 | 9.44 | 8.85 | 8.44 | 7.85 | 8.05 | 8.55 |
|  |  | tan δ (40° C.) | Target: ≤0.25 | 0.255 | 0.215 | 0.285 | 0.282 | 0.205 | 0.181 | 0.212 | 0.288 |
|  |  | Index of tan δ | Relative to Comparative Example 1 | 100 | 116 | 88 | 89 | 120 | 129 | 117 | 95 |
|  |  | Index of wet grip performance | Target: ≥100 | 100 | 90 | 80 | 85 | 90 | 65 | 80 | 100 |
|  |  | Index of abrasion resistance | Target: ≥110 | 100 | 115 | 125 | 125 | 90 | 115 | 130 | 90 |
|  |  | Average of three indexes (abrasion resistance weighted with a weight of 3) | Target: >105 | 100 | 110 | 109 | 110 | 96 | 108 | 117 | 93 |
|  |  | Elongation at break (EB) % | Target: >450 | 485 | 485 | 460 | 525 | 505 | 440 | 575 | 500 |

| | | | | Comparative Examples | | | | | | |
|---|---|---|---|---|---|---|---|---|---|---|
| | | | | 9 | 10 | 11 | 12 | 13 | 14 | 15 |
| Amount (part(s) by mass) | NR | NR | | — | — | — | — | — | — | — |
|  | BR | BR1 | | — | 30 | 35 | 35 | 35 | 35 | 35 |
|  |  | BR2 | | — | — | — | — | — | — | — |
|  |  | Modified BR1 for silica | | 30 | — | 20 | 20 | 20 | 20 | 20 |

TABLE 2-continued

|  |  |  |  |  |  |  |  |  |
|---|---|---|---|---|---|---|---|---|
|  | Modified BR2 for silica | | — | — | — | — | — | — | — |
|  | Modified BR for CB | | — | — | — | — | — | — | — |
|  | Total BR | | 30 | 30 | 55 | 55 | 55 | 55 | 55 |
| SBR | Modified SBR1 for silica | | 70 | 35 | 45 | 45 | 45 | 45 | 45 |
|  | Modified SBR2 for silica | | — | — | — | — | — | — | — |
|  | E-SBR | | — | 35 | — | — | — | — | — |
|  | Total SBR | | 70 | 70 | 45 | 45 | 45 | 45 | 45 |
| CB | Carbon black 1 (114 m²/g) | | — | — | — | — | — | — | — |
|  | Carbon black 2 (78 m²/g) | | — | — | 35 | — | — | — | — |
|  | Carbon black 3 (231 m²/g) | | — | — | — | — | — | — | — |
|  | Carbon black 4 (269 m²/g) | | — | — | — | 25 | — | — | — |
|  | Carbon black 5 (165 m²/g) | | 25 | 25 | — | — | 25 | 25 | 25 |
|  | Total CB | | 25 | 25 | 35 | 25 | 25 | 25 | 25 |
|  | Total CB/Total BR | | 0.833 | 0.833 | 0.636 | 0.455 | 0.455 | 0.455 | 0.455 |
| Silica | Silica 1 (90 m²/g) | | — | — | — | — | 60 | — | — |
|  | Silica 2 (115 m²/g) | | — | — | — | — | — | 60 | — |
|  | Sgica 3 (165 m²/g) | | — | — | — | — | — | — | — |
|  | Silica 4 (175 m²/g) | | 60 | 60 | 60 | 60 | — | — | — |
|  | Silica 5 (215 m²/g) | | — | — | — | — | — | — | — |
|  | Silica 6 (235 m²/g) | | — | — | — | — | — | — | — |
|  | Silica 7 (260 m²/g) | | — | — | — | — | — | — | — |
|  | Slica 8 (280 m²/g) | | — | — | — | — | — | — | 60 |
|  | Total silica | | 60 | 60 | 60 | 60 | 60 | 60 | 60 |
|  | Total silica/Total SBR | | 0.857 | 0.857 | 1.333 | 1.333 | 1.333 | 1.333 | 1.333 |
| Resin | Coumarone indene resin 1 | | 2 | 2 | 2 | 2 | 2 | 2 | 2 |
|  | Coumarone indene resin 2 | | — | — | — | — | — | — | — |
|  | Coumarone indene resin 3 | | — | — | — | — | — | — | — |
|  | Coumarone indene resin 4 | | 4 | 4 | 4 | 4 | 4 | 4 | 4 |
|  | Coumarone indene resin 5 | | — | — | — | — | — | — | — |
|  | Aromatic vinyl polymer | | 6 | 6 | 6 | 6 | 6 | 6 | 6 |
|  | Polyterpene resin | | — | — | — | — | — | — | — |
|  | Terpene phenol resin | | — | — | — | — | — | — | — |
|  | Gum rosin resin | | — | — | — | — | — | — | — |
|  | Petroleum C5 Resin | | — | — | — | — | — | — | — |
|  | Petroleum C9 Resin | | — | — | — | — | — | — | — |
| Oil | TDAE | | 12 | 12 | 12 | 12 | 12 | 12 | 12 |
| Others | Wax | | 1.5 | 1.5 | 1.5 | 1.5 | 1.5 | 1.5 | 1.5 |
|  | Antioxidant | | 3 | 3 | 3 | 3 | 3 | 3 | 3 |
|  | TMQ | | 1 | 1 | 1 | 1 | 1 | 1 | 1 |
|  | Stearic acid | | 3 | 3 | 3 | 3 | 3 | 3 | 3 |
|  | Zinc oxide | | 2.5 | 2.5 | 2.5 | 2.5 | 2.5 | 2.5 | 2.5 |
|  | Silane coupling agent | | 4.8 | 4.8 | 4.8 | 4.8 | 4.8 | 4.8 | 4.8 |
|  | 5% Oil-containing powder sulfur | | 1.5 | 1.5 | 1.5 | 1.5 | 1.5 | 1.5 | 1.5 |
|  | TBBS | | 2 | 2 | 1.5 | 1.5 | 1.5 | 1.5 | 1.5 |
|  | DPG | | 2 | 2 | 1.5 | 1.5 | 1.5 | 1.5 | 1.5 |
| Evaluation results | E* (40° C. 2% amplitude) | Target: 7.5-9.5 | 8.05 | 9.12 | 7.75 | 9.28 | 6.85 | 7.35 | 9.25 |
|  | tan δ (40° C.) | Target: ≤0.25 | 0.225 | 0.289 | 0.225 | 0.251 | 0.172 | 0.188 | 0.275 |
|  | Index of tan δ | Relative to Comparative Example 1 | 112 | 87 | 112 | 102 | 133 | 126 | 92 |
|  | Index of wet grip performance | Target: ≥100 | 105 | 100 | 100 | 100 | 115 | 115 | 90 |
|  | Index of abrasion resistance | Target: ≥110 | 80 | 100 | 105 | 105 | 85 | 100 | 115 |
|  | Average of three indexes (abrasion resistance weighted with a weight of 3) | Target: >105 | 91 | 97 | 105 | 103 | 101 | 103 | 105 |
|  | Elongation at break (EB) % | Target: >450 | 470 | 560 | 445 | 440 | 430 | 460 | 425 |

Tables 1 and 2 show that excellent abrasion resistance and good fuel economy, wet grip performance and elongation at break (durability) were obtained in Examples in which 40 to 75% by mass of butadiene rubber and 25 to 55% by mass of styrene butadiene rubber were contained based on 100% by mass of the rubber component; 40 to 120 parts by mass of a silica having a nitrogen adsorption specific surface area of 160 to 270 m²/g and 15 to 50 parts by mass of a carbon black having a nitrogen adsorption specific surface area of 100 to 250 m²/g were contained per 100 parts by mass of the rubber component; and the ratio of the total content of silica to the total content of styrene butadiene rubber was 0.70 to 2.50, and the ratio of the total content of carbon black to the total content of butadiene rubber was 0.25 to 0.75.

The invention claimed is:

1. A rubber composition for a tread, which comprises, based on 100% by mass of a rubber component,
    40 to 75% by mass of butadiene rubber comprising at least one member selected from the group consisting of a butadiene rubber synthesized with a rare earth catalyst and a modified butadiene rubber for silica, and
    25 to 55% by mass of styrene butadiene rubber which includes a modified styrene butadiene rubber for silica; and comprises, per 100 parts by mass of the rubber component,
    40 to 120 parts by mass of a silica having a nitrogen adsorption specific surface area of 160 to 270 m²/g, and 15 to 50 parts by mass of a carbon black having a nitrogen adsorption specific surface area of 100 to 250 m²/g, wherein a ratio of a total content of silica to a total content of styrene butadiene rubber is 0.70 to 2.50, and a ratio of a total content of carbon black to a total content of butadiene rubber is 0.25 to 0.75, and where the modified styrene butadiene rubber for silica has been modified with a compound represented by formula (1):

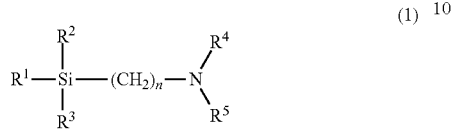

wherein $R^1$, $R^2$, and $R^3$ each represents a methoxy group, n is 3, and $R^4$ and $R^5$ each represents a hydrogen atom.

2. The rubber composition for a tread according to claim 1, wherein the rubber component comprises 40 to 75% by mass of butadiene rubber comprising 5% by mass or more, based on 100% by mass of the rubber component, of a butadiene rubber synthesized with a rare earth catalyst and 5% by mass or more, based on 100% by mass of the rubber component, of a modified butadiene rubber for silica;
15 to 50 parts by mass of the carbon black having a nitrogen adsorption specific surface area of 100 to 180 $m^2/g$ is contained per 100 parts by mass of the rubber component; and
the ratio of a total content of carbon black to a total content of butadiene rubber is 0.40 to 0.75.

3. The rubber composition for a tread according to claim 1, wherein the rubber composition comprises a liquid resin having a softening point of −20 to 45° C., and the liquid resin is at least one of a liquid coumarone indene resin and a liquid terpene resin.

4. The rubber composition for a tread according to claim 1, wherein the rubber composition comprises at least one resin selected from the group consisting of a terpene resin having a softening point of 46 to 160° C., a rosin resin having a softening point of 46 to 140° C., a C5 petroleum resin having a softening point of 46 to 140° C., and an aromatic resin having a softening point of 46 to 140° C.

5. The rubber composition for a tread according to claim 4, wherein the aromatic resin is at least one of a coumarone indene resin, an indene resin and an aromatic vinyl polymer that is a resin obtained by polymerizing at least one of α-methylstyrene and styrene.

6. The rubber composition for a tread according to claim 1, wherein the rubber composition comprises a liquid coumarone indene resin having a softening point of −20 to 45° C., a coumarone indene resin having a softening point of 46 to 140° C., and one of an aromatic vinyl polymer having a softening point of 46 to 140° C. and a terpene resin having a softening point of 46 to 160° C., wherein the aromatic vinyl polymer is a resin obtained by polymerizing at least one of α-methylstyrene and styrene.

7. A pneumatic tire, formed from the rubber composition according to claim 1.

8. The pneumatic tire according to claim 7, for use as a tire for passenger vehicles or a tire for sport utility vehicles.

* * * * *